United States Patent
Choi et al.

(10) Patent No.: US 9,819,944 B2
(45) Date of Patent: Nov. 14, 2017

(54) MULTI-LAYER VIDEO CODING METHOD FOR RANDOM ACCESS AND DEVICE THEREFOR, AND MULTI-LAYER VIDEO DECODING METHOD FOR RANDOM ACCESS AND DEVICE THEREFOR

(71) Applicant: SAMSUNG ELECTRONICS CO., LTD., Suwon-si (KR)

(72) Inventors: Byeong-doo Choi, Suwon-si (KR); Min-woo Park, Hwaseong-si (KR); Ho-cheon Wey, Seongnam-si (KR); Jae-won Yoon, Seoul (KR); Jin-young Lee, Hwaseong-si (KR); Yong-jin Cho, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 210 days.

(21) Appl. No.: 14/784,173

(22) PCT Filed: Apr. 14, 2014

(86) PCT No.: PCT/KR2014/003213
§ 371 (c)(1),
(2) Date: Oct. 13, 2015

(87) PCT Pub. No.: WO2014/168463
PCT Pub. Date: Oct. 16, 2014

(65) Prior Publication Data
US 2016/0080747 A1 Mar. 17, 2016

Related U.S. Application Data

(60) Provisional application No. 61/811,333, filed on Apr. 12, 2013.

(51) Int. Cl.
*H04N 19/172* (2014.01)
*H04N 19/507* (2014.01)
(Continued)

(52) U.S. Cl.
CPC ......... *H04N 19/172* (2014.11); *H04N 19/103* (2014.11); *H04N 19/107* (2014.11);
(Continued)

(58) Field of Classification Search
CPC .. H04N 19/172; H04N 19/507; H04N 19/103; H04N 19/70
See application file for complete search history.

(56) References Cited

U.S. PATENT DOCUMENTS

2012/0050475 A1   3/2012  Tian et al.
2013/0287366 A1*  10/2013 Wang ............... G06F 17/30852
                                                    386/241
2014/0146885 A1   5/2014  Park et al.

FOREIGN PATENT DOCUMENTS

KR   10-2011-0127175 A   11/2011
KR   10-2012-0024578 A   3/2012
(Continued)

OTHER PUBLICATIONS

Search Report dated Jul. 28, 2014, issued by the International Searching Authority in counterpart International Patent Application No. PCT/KR2014/003213 (PCT/ISA/210).
(Continued)

*Primary Examiner* — Nam Pham
(74) *Attorney, Agent, or Firm* — Sughrue Mion, PLLC

(57) ABSTRACT

Provided is a video decoding method including determining whether a random access point (RAP) picture is positioned in an enhancement layer; determining whether a random access skipped leading (RASL) picture related to the RAP picture is output; and if the RAP picture is positioned in the enhancement layer and the RASL picture is determined not to be output, activating a SPS corresponding to the RAP picture when the RAP picture that is not at a start point of a CVS is decoded.

14 Claims, 31 Drawing Sheets

(51) Int. Cl.
    *H04N 19/103*    (2014.01)
    *H04N 19/30*    (2014.01)
    *H04N 19/70*    (2014.01)
    *H04N 19/46*    (2014.01)
    *H04N 19/107*    (2014.01)
    *H04N 19/157*    (2014.01)
    *H04N 19/187*    (2014.01)

(52) U.S. Cl.
    CPC ......... *H04N 19/157* (2014.11); *H04N 19/187* (2014.11); *H04N 19/30* (2014.11); *H04N 19/46* (2014.11); *H04N 19/507* (2014.11); *H04N 19/70* (2014.11)

(56) References Cited

FOREIGN PATENT DOCUMENTS

| KR | 10-2012-0072718 A | 7/2012 |
| --- | --- | --- |
| KR | 10-2013-0004436 A | 1/2013 |

OTHER PUBLICATIONS

Written Opinion dated Jul. 28, 2014, issued by the International Searching Authority in counterpart International Patent Application No. PCT/KR2014/003213 (PCT/ISA/237).

Sjoberg, R., et al., "Overview of HEVC High-Level Syntax and Reference Picture Management", IEEE Transactions on Circuits and Systems for Video Technology, vol. 22, No. 12, pp. 1858-1870, Dec. 2012.

Chen, J., et al., "SHVC Test Model 1 (SHM 1)", JCT-VC, 12th Meeting, Jan. 14, 2013-Jan. 23, 2013, Geneva, Switzerland, 41 pages total.

Tech, G., et al., "MV-HEVC Draft Text 3 (ISO/IEC 23008-2:201x/PDAM2)", JCT-3V, 3rd Meeting, Jan. 17, 2013-Jan. 23, 2013, Geneva Switzerland, 34 pages total.

Byeongdoo Choi et al., "On random access point for HEVC extension", Joint Collaborative Team on Video Coding (JCT-VC) of ITU-T SG WP 3 and ISO/IEC JTC 1/SC 29/WG 11 13th Meeting: Incheon, KR, Apr. 18-26, 2013, Document: JCTVC-M0168, XP030114125 (Cited with date Apr. 9, 2013 in Cite No. 3) (4 Pages Total).

Byeongdoo Choi et al., "3D-HEVC HLS : On Picture order counts", International Organisation For Standardisation Organisation Internationale De Normalisation ISO/IEC JTC1/SC29/WG11 Coding Of Moving Pictures And Audio, ISO/IEC JTC1/SC29/WG11, MPEG2012/M24874 May 2012, Geneva, Switzerland, XP030053217 (Cited with dates Apr. 30, 2012—May 4, 2012; and Apr. 27, 2012 in Cite No. 3) (3 Pages Total).

Communication dated Sep. 27, 2016, from the European Patent Office in counterpart European Application No. 14782662.2.

\* cited by examiner

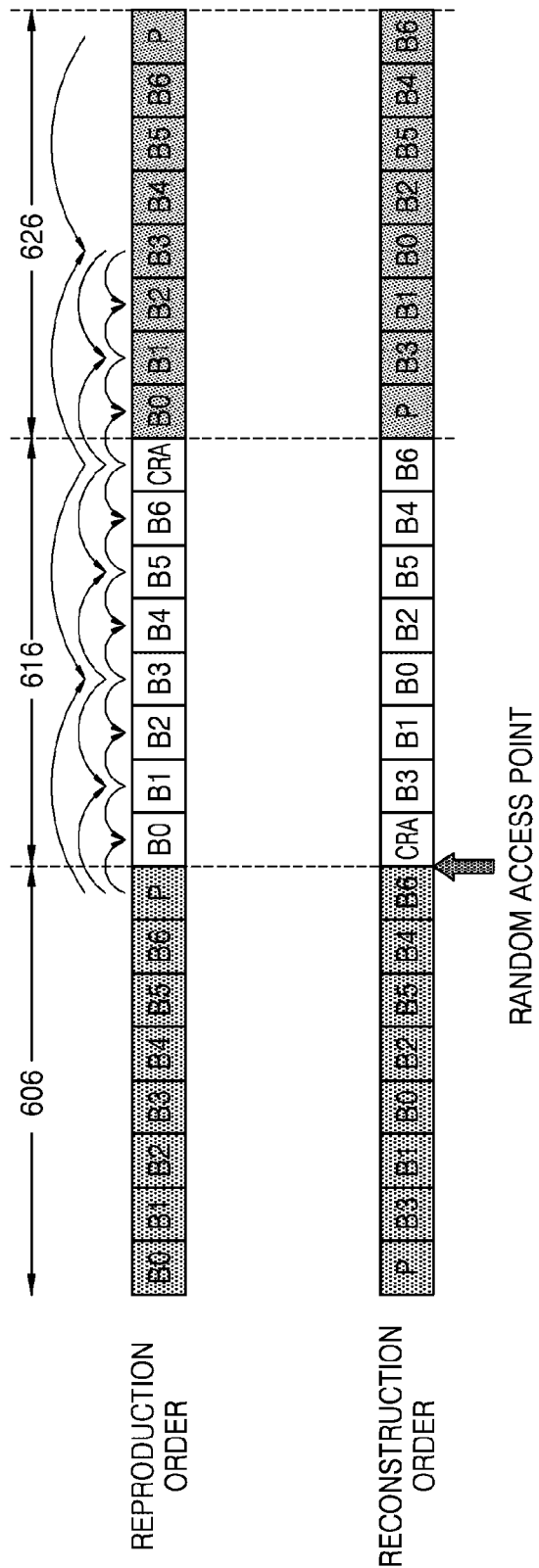

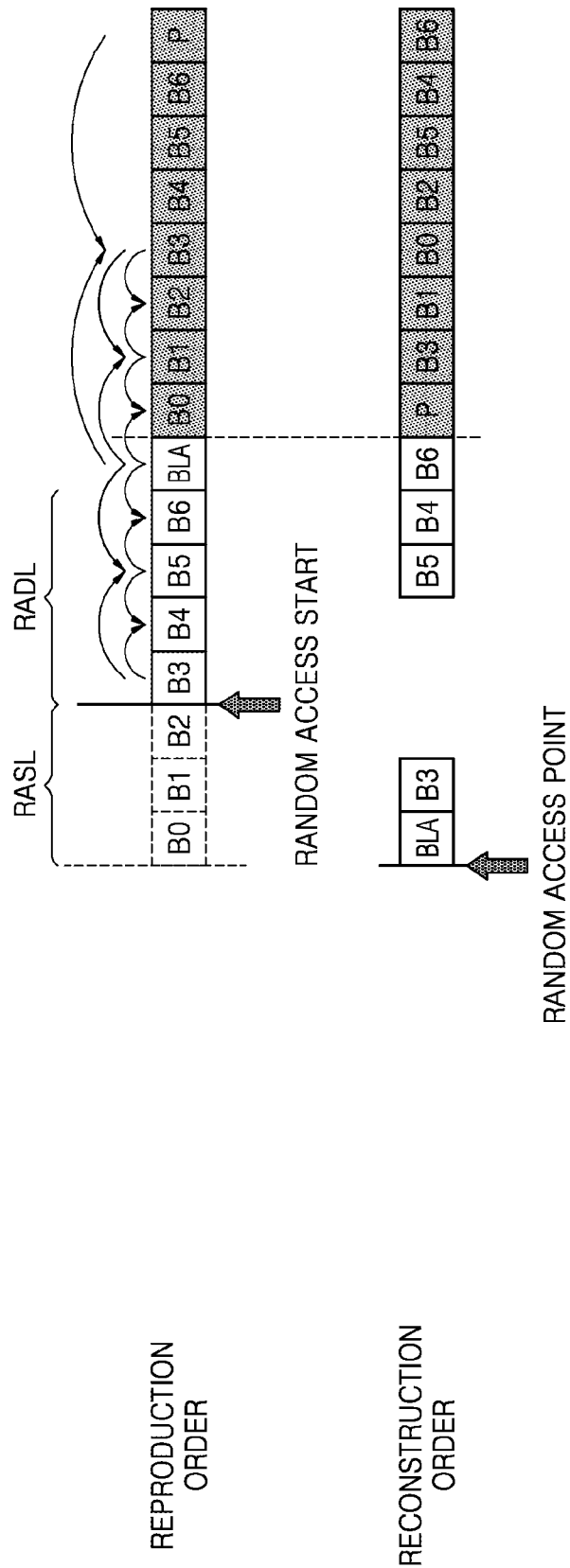

CODING UNIT (1010)

MULTI-LAYER VIDEO CODING METHOD FOR RANDOM ACCESS AND DEVICE THEREFOR, AND MULTI-LAYER VIDEO DECODING METHOD FOR RANDOM ACCESS AND DEVICE THEREFOR

TECHNICAL FIELD

The present invention relates to video encoding and decoding using a multilayer prediction structure based on inter prediction, intra prediction, and inter-layer prediction.

BACKGROUND ART

As hardware for reproducing and storing high resolution or high quality video content is being developed and supplied, a need for a video codec for effectively encoding or decoding the high resolution or high quality video content is increasing. According to a video codec of the related art, a video is encoded according to a limited encoding method based on a macroblock having a predetermined size.

Image data of a spatial domain is transformed into coefficients of a frequency domain via frequency transformation. According to a video codec, an image is split into blocks of predetermined size, discrete cosine transformation (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multilayer video codec encodes and decodes a base layer video and one or more enhancement layer videos. By removing temporal/spatial redundancies of each of a base layer video and an enhancement layer video and by removing redundancy between layers, amounts of data of the base layer video and the enhancement layer video may be reduced.

DETAILED DESCRIPTION OF THE INVENTIVE CONCEPT

Technical Problem

Various embodiments may provide a decoding method that is effective when random access occurs in a multilayer video.

Technical Solution

According to an aspect of the inventive concept, there is provided a video decoding method including determining whether a random access point (RAP) picture is positioned in an enhancement layer; determining whether a random access skipped leading (RASL) picture related to the RAP picture is output; and if the RAP picture is positioned in the enhancement layer and the RASL picture is determined not to be output, activating a sequence parameter set (SPS) corresponding to the RAP picture when the RAP picture that is not at a start point of a coded video sequence (CVS) is encoded.

Advantageous Effects

Various embodiments provide a method capable of effectively performing decoding when random access occurs.

DESCRIPTION OF THE DRAWINGS

FIGS. 6A and 6B illustrate reproduction order and reconstruction order of a clear random access (CRA) image, according to two embodiments.

FIGS. 7A and 7B illustrate reproduction order and reconstruction order of a broken link access (BLA) image, according to two embodiments.

BEST MODE

According to an aspect of the inventive concept, there is provided a video decoding method including determining whether a random access point (RAP) picture is positioned in an enhancement layer; determining whether a random access skipped leading (RASL) picture related to the RAP picture is output; and if the RAP picture is positioned in the enhancement layer and the RASL picture is determined not to be output, activating a sequence parameter set (SPS) corresponding to the RAP picture when the RAP picture that is not at a start point of a coded video sequence (CVS) is encoded.

Mode of the Inventive Concept

Hereinafter, a multilayer video encoding apparatus, a multilayer video decoding apparatus, a multilayer video encoding method, and a multilayer video decoding method according to embodiments are provided with reference to FIGS. 1A through 7B. Also, a multilayer video encoding apparatus and a multilayer video decoding apparatus, and a multilayer video encoding method and a multilayer video decoding method based on coding units of a tree structure according to embodiments are provided with reference to FIGS. 8 through 20. Also, various embodiments to which the multilayer video encoding method, the multilayer video decoding method, a video encoding method and a video decoding method according to the embodiments may be applied are provided with reference to FIGS. 21 through 27.

Hereinafter, an 'image' may indicate a still image of a video or a moving picture, i.e., the video itself.

First, with reference to FIGS. 1A through 7B, a multilayer video encoding apparatus and a multilayer video encoding method, and a multilayer video decoding apparatus and a multilayer video decoding method according to embodiments are provided.

Figure 1A:
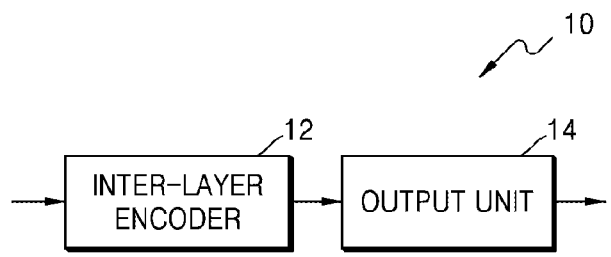
FIG. 1A illustrates a block diagram of a multilayer video encoding apparatus, according to an embodiment of the present invention.
Figure 1B:
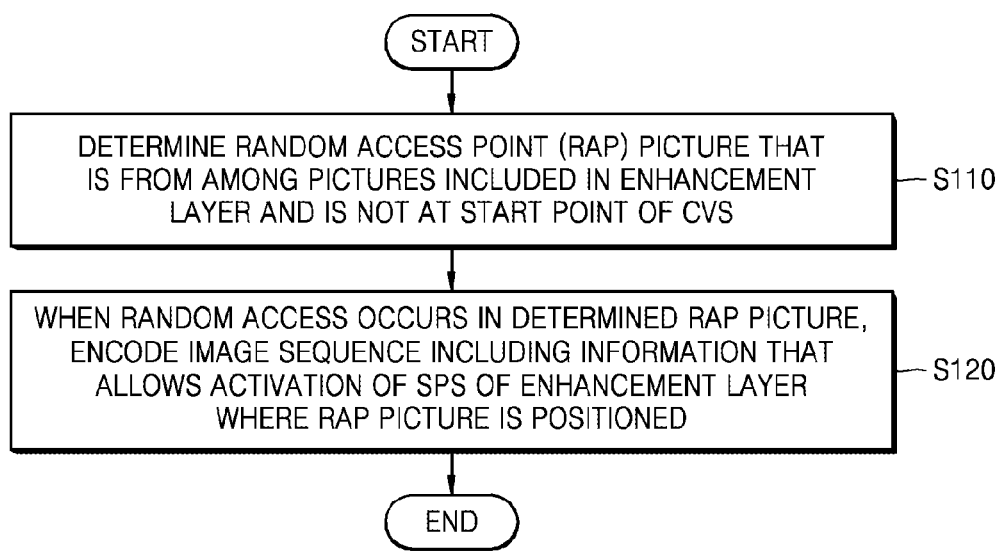
FIG. 1B illustrates a flowchart of a multilayer video encoding method by the multilayer video encoding apparatus of FIG. 1A.

FIG. 1A illustrates a block diagram of a multilayer video encoding apparatus 10, according to an embodiment of the present invention. FIG. 1B illustrates a flowchart of a multilayer video encoding method 11 by the multilayer video encoding apparatus 10 of FIG. 1A.

The multilayer video encoding apparatus 10 according to the present embodiment includes an inter-layer encoder 12 and an output unit 14.

The multilayer video encoding apparatus 10 according to the present embodiment may encode each of a plurality of videostreams according to layers by using a scalable video coding method. The multilayer video encoding apparatus 10 according to the present embodiment may encode base layer images and enhancement layer images.

For example, a multiview video may be encoded according to the scalable video coding method. Each of center-view images, left-view images, and right-view images may be encoded, and among these images, the center-view images may be encoded as the base layer images, the left-view images may be encoded as first enhancement-layer images, and the right-view images may be encoded as second enhancement-layer images. A result of encoding the base layer images may be output as a base layer stream, and results of encoding the first enhancement-layer images and the second enhancement-layer images may be output, via the output unit 14, as a first enhancement-layer stream and a second enhancement-layer stream, respectively.

As another example, the scalable video coding method may be performed according to temporal hierarchical prediction. A base layer stream including encoding information generated by encoding images with a base frame rate may be output. Images with a high-speed frame rate may be further encoded by referencing the images with the base frame rate, so that an enhancement layer stream including encoding information of the high-speed frame rate may be output. The scalable video coding method according to the temporal hierarchical prediction is described later with reference to FIG. 4B.

Also, scalable video coding on a base layer and a plurality of enhancement layers may be performed. If three or more enhancement layer images exist, base layer images, first enhancement-layer images, second enhancement-layer images, . . . , and kth enhancement-layer images may be encoded. Accordingly, a result of encoding the base layer images may be output as a base layer stream, and results of encoding the first, second, . . . , and kth enhancement-layer images may be output as a first enhancement-layer stream, a second enhancement-layer stream, . . . , and a kth enhancement-layer stream, respectively.

The multilayer video encoding apparatus 10 according to the present embodiment encodes each of blocks of each of images of a video according to layers. A type of a block may be a square, a rectangle, or a random geometric shape. The block is not limited to a data unit of a constant size. The block according to the present embodiment may be a largest coding unit (LCU), a coding unit, a prediction unit, a transformation unit, etc. from among coding units of a tree structure. Video encoding and decoding methods based on the coding units of the tree structure are described later with reference to FIGS. 8 through 20.

The multilayer video encoding apparatus 10 according to the present embodiment may perform inter prediction by which a current image is predicted by cross-referencing images of a same layer. Via the inter prediction, a motion vector indicating motion information between the current image and a reference image, and a residual component between the current image and the reference image may be generated.

Also, the multilayer video encoding apparatus 10 according to the present embodiment may perform inter-layer prediction by which enhancement layer images are predicted by referencing base layer images. The multilayer video encoding apparatus 10 according to the present embodiment may perform inter-layer prediction by which second enhancement layer images are predicted by referencing first enhancement layer images. Via the inter-layer prediction, a location difference component between a reference image of another layer and the current image, and a residual component between the reference image of the other layer and the current image may be generated.

When the multilayer video encoding apparatus 10 according to the present embodiment allows two or more enhancement layers, inter-layer prediction between images of a base layer and images of the two or more enhancement layers may be performed according to a multilayer prediction structure.

The inter prediction and the inter-layer prediction may be performed by using a data unit of the coding unit, the prediction unit, or the transformation unit.

The inter-layer encoder 12 according to the present embodiment generates a base layer stream by encoding base layer images. The inter-layer encoder 12 may perform inter prediction between the base layer images. The inter-layer encoder 12 according to the present embodiment may encode random access point (RAP) images without referencing any image, wherein the RAP images are randomly accessible from among the base layer images.

I-type RAP images may be one of an instantaneous decoding refresh (IDR) image, a clean random access (CRA) image, a broken link access (BLA) image, a temporal sub-layer access (TSA) image, and an stepwise temporal sub-layer access (STSA) image.

A picture order count (POC) is a value related to each coded picture and indicates a corresponding picture in a coded video sequence (CVS). A relative temporal distance between pictures is expressed via a POC of each of pictures existing in a same CVS. When a certain picture is output, a POC means relative output order compared to other pictures in a same CVS.

A clean random access (CRA) picture is an encoded picture including only an I-slice, wherein each slice has nal_unit_type of 4. All encoded pictures that follow the CRA picture in both decoding order and output order may not be inter-predicted from any picture that precedes the CRA picture in any one of decoding order and output order. One or more pictures that precede the CRA picture in decoding order also precede the CRA picture in output order.

An instantaneous decoding refresh (IDR) picture is an encoded picture whose IdrPicFlag is 1, and when a decoding apparatus performs a decoding process on the IDR picture, the decoding apparatus marks all reference pictures as a "not referenced" status. All encoded pictures that follow the IDR picture in decoding order cannot be encoded without inter prediction from any picture that precedes the IDR picture in decoding order. A first picture in decoding order in each encoded video sequence is the IDR picture.

A broken link indicates positions of some pictures of a bitstream, wherein some pictures that are sequential in decoding order may include serious visual artifacts due to unspecified operations performed while the bitstream is generated.

A broken link access (BLA) unit is an access unit where an encoded picture is a BLA picture. A BLA picture is a random access point picture where each slice has nal_unit_type of 6 or 7. The BLA picture is a CRA picture having a broken link.

A temporal sub-layer access (TSA) picture is a picture used in performing up-switching a temporal layer, and is an encoded picture where each VCL NAL unit has TSA_R or TSA_N nal_unit_type. A stepwise temporal sub-layer access (STSA) picture is a picture used for gradual temporal up-switching, and is an encoded picture where each VCL NAL unit has STSA_R or STSA_N nal_unit_type.

Also, RAP images may be referenced by leading pictures and trailing pictures. The leading pictures and trailing pictures are behind the RAP images in reconstruction order, however, the leading image precedes the RAP image in reproduction order, and the trailing image is behind the RAP image in reconstruction order. The trailing image may also be called a normal picture.

A leading image may be classified as a random access decodable leading (RADL) image or a random access skipped leading (RASL) image. When random access occurs in a RAP image that is behind the leading image in reproduction order, the RADL image may be reconstructed but the RASL image cannot be reconstructed.

NoRaslOutputFlag is a flag required to indicate whether or not an RASL picture is output. For example, if the RASL picture is not output, NoRaslOutputFlag may be determined as 1. As another example, if random access occurs in a CRA picture or a BLA picture, NoRaslOutputFlag may be determined as 1. As another example, if splicing occurs, NoRaslOutputFlag may be determined as 1. As another example, if layer switching occurs, NoRaslOutputFlag may be determined as 1. As another example, if a CRA picture or a BLA picture exists at a position where video decoding starts, NoRaslOutputFlag may be determined as 1.

When random access occurs in a CRA picture, the CRA picture may be changed to a BLA picture. NoRaslOutputFlag of the BLA picture may be 1.

However, even if random access occurs in a CRA picture, the CRA picture may not be changed to a BLA picture. For example, if random access occurs in a read-only memory (ROM), a CRA picture cannot be changed to a BLA picture. However, if the random access occurred, NoRaslOutputFlag of the CRA picture that is not changed to the BLA picture may be 1. Therefore, if NoRaslOutputFlag is 1, an RASL picture may not be output with respect to the CRA picture.

A CVS is a coded video sequence, and when a start position of the CVS is decoded, a sequence parameter set (SPS) may be activated. However, the SPS may be activated at a position that is not the start position of the CVS, and details thereof are described at a later time. An RAP access unit may be the start position of the CVS.

When a particular SPS is activated, the activation may mean that an inter-layer decoder 24 parses the particular SPS. When the particular SPS is parsed, the inter-layer decoder 24 may perform, by using the parsed SPS, decoding on an image sequence corresponding to the particular SPS.

The inter-layer encoder 12 according to the present embodiment may perform inter prediction on non-RAP images that are obtained from base layer images by excluding base layer RAP images. Intra prediction may be performed on the base layer RAP images by referring to neighboring pixels in an image. The inter-layer encoder 12 according to the present embodiment may generate encoded data by performing encoding on result data generated as a result of performing inter prediction or intra prediction. For example, transformation, quantization, entropy encoding, etc. may be performed on an image block including the result data generated as the result of performing inter prediction or intra prediction.

The inter-layer encoder 12 according to the present embodiment may generate a base layer stream including encoded data of a base layer RAP image and encoded data of remaining base layer images. The inter-layer encoder 12 may output, via the output unit 14, the base layer stream along with motion vectors that are generated via inter prediction between the base layer images.

Also, the inter-layer encoder 12 according to the present embodiment generates an enhancement layer stream by encoding enhancement layer images. When the inter-layer encoder 12 according to the present embodiment encodes a plurality of enhancement layer images, the inter-layer encoder 12 encodes the enhancement layer images according to layers, and generates an enhancement layer stream of each of the layers. Hereinafter, for convenience of description, an encoding operation by the inter-layer encoder 12 to encode an enhancement layer is described as an operation with respect to enhancement layer images of one layer. However, the operation by the inter-layer encoder 12 is not performed only on the enhancement layer images of one layer, thus, the operation may be equally applied to each of enhancement layer images of another layer.

The inter-layer encoder 12 according to the present embodiment may perform inter-layer prediction referencing base layer images and inter prediction referencing same layer images, in order to encode an enhancement layer image.

The inter prediction or the inter-layer prediction is available only when a reference target image was first reconstructed. Therefore, when a first image is first encoded in a current layer, if another image of a same layer has to be referenced, the first image cannot be encoded. Therefore, a randomly-accessible RAP image has to be encoded without referencing another image of the same layer. In the present embodiment, when random access occurs in the RAP image, even if there are no images that were first reconstructed in the same layer, the RAP image may be immediately decoded and output.

While first layer images are decoded according to a multilayer prediction structure of the multilayer video encoding apparatus 10 according to the present embodiment, second layer images may be decoded due to layer switching. For example, when a view change occurs in a multiview image structure or a change occurs in a temporal layer in a temporal hierarchical prediction structure, the layer switching may be performed in the multilayer prediction structure. Even in this case, same layer images that were first reconstructed do not exist at a point of the layer switching, the inter prediction is not available.

The inter-layer encoder 12 according to the present embodiment may record encoded data to a NAL unit. NAL unit-type information may indicate whether a current image is a trailing picture, a TSA pictures, an STSA image, an RADL image, an RASL image, a BLA image, an IDR image, a CRA image, or a VLA image.

The inter-layer encoder 12 according to various embodiments may encode a multilayer video so as to perform random access on layers independently of each other. Hereinafter, a method of encoding a multilayer video, the method being performed by the inter-layer encoder 12, is described.

The inter-layer encoder 12 may independently encode an RAP picture with respect to a plurality of layers including a base layer and an enhancement layer. The RAP picture includes an IDR picture, a CRA picture, and a BLA picture. The inter-layer encoder 12 may encode the IDR picture to be aligned in all layers.

Hereinafter, alignment may mean that same-type pictures are shown in all layers at a particular view. For example, if an IDR picture has to be encoded at a POC of a particular view in one layer from among a plurality of layers, the inter-layer encoder 12 may encode all pictures of all layers at the corresponding POC as IDR pictures.

A group of pictures having a same POC and included in different layers may be encoded as an access unit. Therefore, pictures included in a same access unit may have a same POC.

To do so, the inter-layer encoder 12 may encode an IDR picture in an enhancement layer image. For example, IDR pictures having a layer identifier nuh_layer_id greater than 0 may be generated. Even if inter prediction is not allowed, the inter-layer encoder 12 may perform inter-layer prediction and thus may generate the IDR picture.

The inter-layer encoder 12 may generate IDR pictures in an access unit about an image without a layer or in an access unit about all layers. For example, an IDR-type NAL unit may be an IDR access unit where decoding of all layers may start.

The inter-layer encoder 12 may encode a CRA picture not to be aligned in all layers. For example, it is not required to encode the CRA picture to be shown in all layers at a POC of a particular view. The inter-layer encoder 12 may generate a CRA NAL unit with respect to an enhancement layer. For example, when nuh_layer_id is greater than 0, the inter-layer encoder 12 may use a CRA NAL unit type. Even if inter prediction is not allowed, the inter-layer encoder 12 may perform inter-layer prediction and thus may generate the CRA picture. For example, the inter-layer encoder 12 cannot use the inter prediction so as to encode the CRA picture but may use the inter-layer prediction with respect to CRA NAL units having nuh_layer_id that is greater than 0.

When the inter-layer encoder 12 generates the CRA NAL units, it is not required for the inter-layer encoder 12 to align pictures so that the CRA NAL units are shown in layers at a same view. One CRA NAL unit type may be used for all VCL NAL units having a particular nuh_layer_id value. For example, one BLA NAL unit type may be used only for NAL units corresponding to a particular layer identifier, and a NAL unit type different from the BLA NAL unit type may be used for all VCL NAL units that have a particular nuh_layer_id value and are a same access unit. Since the BLA NAL unit type may not be aligned, even if the BLA NAL unit type is positioned in a particular layer in an access unit, an NAL unit type other than the BLA NAL unit type may be positioned in another layer of the same access unit.

When bitstreams are spliced, all CRA pictures in the access unit may be changed to BLA pictures.

Also, CRA NAL unit type may be encoded to be positioned in a layer whose nuh_layer_id is 0, and CRA NAL units may be encoded to be positioned in the middle of a CVS. The inter-layer encoder 12 may encode an image sequence, so that CRA NAL unit type may be positioned in the middle of a CVS of a base layer. Alternatively, the inter-layer encoder 12 may encode an image sequence, so that CRA NAL unit type may be positioned in the middle of a CVS of an enhancement layer.

The inter-layer encoder 12 may encode an image sequence, so that a first NAL unit of a layer becomes an IDR picture or a BLA picture at a splicing point, where the first NAL unit has a nuh_layer_id value that is greater than a maximum nuh_layer_id value of a previous NAL unit.

When bitstreams are sp
an output unit configured to generate a bitstream for transmitting the encoded data.

The inter-layer encoder 12 may encode an image sequence, so that a first NAL unit of a layer becomes an IDR picture or a BLA picture at a layer up-switching point, where the first NAL unit has a nuh_layer_id value that is greater than a maximum nuh_layer_id value of a previous NAL unit.

When a bitstream is extracted from an upper layer of a previous layer, the inter-layer encoder 12 may encode an image sequence, so that CRA NAL units related to the upper layer at a layer switching point are changed to BLA NAL unit.

BLA pictures from among multilayer encoded images may be encoded not to be aligned in all layers.

For example, a BLA NAL unit type may be used for VCL NAL units of a particular layer, and a unit type other than the BLA NAL unit type may be used for VCL NAL units of another layer in a same access unit.

Since the BLA NAL unit type can be used when nuh_layer_id is greater than 0, an image sequence may be encoded so that a BLA NAL unit is shown in an enhancement layer. When bitstreams are spliced, the inter-layer encoder 12 may encode an image sequence, so that all CRA pictures in an access unit are changed to BLA pictures, and when layers are switched, CRA pictures of related layers are changed to BLA pictures. A BLA picture may be used not only to inform splicing of the bitstreams but also to inform layer switching.

For example, the inter-layer encoder 12 may encode an image sequence, so that, when a bitstream is layer up-switched, CRA NAL units of a related upper layer are changed to BLA NAL units.

For example, the inter-layer encoder 12 may encode an image sequence, so that, when a base layer picture is switched to an enhancement layer picture, a CRA NAL unit of the enhancement layer picture is changed to a BLA NAL unit.

The inter-layer encoder 12 may encode an image sequence to independently include an IDR picture, a CRA picture, and a BLA picture with respect to each layer. With respect to the encoded image sequence, random access, splicing, bitstream extraction, and layer switching may be performed on layers independently of each other. For example, the inter-layer encoder 12 may encode an image sequence, so that a sequence parameter set (SPS) may be independently activated by using the IDR picture or the BLA picture of each layer. The inter-layer encoder 12 may encode an image sequence, so that an IDR picture, a CRA picture, and a BLA picture of a base layer may be used as a random access point, and an IDR picture, a CRA picture, and a BLA picture of an enhancement layer may be used as one of a bitstream extraction point and a layer switching point.

The CRA picture of the base layer may be used as the random access point of a bitstream, and the CRA picture of the enhancement layer may be used as the layer switching point or the bitstream extraction point.

The inter-layer encoder 12 may encode a BLA picture not to be aligned in all layers. For example, it is not required for the BLA picture to be shown in all layers at a POC of a particular view. When nuh_layer_id is greater than 0, the inter-layer encoder 12 can use a BLA NAL unit type, thus, the inter-layer encoder 12 may encode the BLA picture in encoding an enhancement layer image. When bitstreams are spliced in a decoding process, all CRA pictures in an access unit may be changed to BLA pictures. When layers are switched in the decoding process, CRA pictures of related layers may be changed to BLA pictures. The BLA picture may be used not only to inform splicing of the bitstreams but also to inform layer switching.

As described above, the encoding apparatus may encode an IDR picture, a CRA picture, and a BLA picture with respect to each layer, so that random access, splicing, bitstream extraction, and layer switching may be performed on the layers independently of each other. For example, an IDR picture or a BLA picture of each layer may separately activate an SPS. The encoding apparatus may encode the IDR picture, the CRA picture, and the BLA picture of the base layer so as to allow them to function as the random access point, and may encode the IDR picture, the CRA picture, and the BLA picture of the enhancement layer so as to allow them to function as one of the bitstream extraction point and the layer switching point.

The inter-layer encoder 12 may encode an image sequence, so that layer switching may occur in the middle of a CVS. A CVS is a coded video sequence, and when a start position of the CVS is decoded, an SPS may be activated. In this regard, an image sequence may be encoded, so that the SPS may be activated at a position that is not the start position of the CVS.

For example, an image sequence may be encoded, so that, when NoRaslOutputFlag is 1, an SPS of a related layer may be activated even if an RAP picture positioned in an enhancement layer is not at a start position of a new CVS. Alternatively, an image sequence may be encoded, so that, when NoRaslOutputFlag is 1, an SPS of a related CVS may be activated even if an RAP picture positioned in an enhancement layer is not at a start position of a new CVS. Details thereof are described at a later time with reference to FIG. 2C.

The inter-layer encoder 12 may encode an image sequence, so that, when random access occurs, a non-decodable RASL picture is discarded, and pictures that reference the discarded RASL picture are also discarded.

The discard may mean deletion from a memory before decoding is performed. For example, the inter-layer decoder 24 may delete a discarded picture from a decoded picture buffer (DPB) before the discarded picture is decoded. Details thereof are described at a later time with reference to FIG. 2D.

A POC is a parameter to count a picture order, and a relative temporal distance between pictures may be expressed via a POC of each of pictures existing in a same CVS. When a POC value is expressed in a bit form, a value corresponding to an upper bit may be expressed as an MSB, and a value corresponding to a lower bit may be expressed as an LSB.

When random access occurs in a base layer, the inter-layer encoder 12 may set an MSB of a POC value as 0. Details thereof are described at a later time with reference to FIG. 2E.

However, when random access occurs in an enhancement layer, the MSB of the POC value may not be 0. Details thereof are described at a later time with reference to FIG. 2F.

FIG. 1B illustrates a flowchart of a multilayer video encoding method 11 by the multilayer video encoding apparatus 10 of FIG. 1A.

In operation S110, the inter-layer encoder 12 encodes an image as an RAP picture, wherein the image is not at a start point of a CVS and is from among pictures included in an enhancement layer.

The CVS is a coded video sequence, and in this regard, one or more RAP pictures may be included in one CVS. For example, a plurality of CRA pictures may be included in one CVS. As another example, a plurality of IDR pictures may be included in one CVS.

Also, an RAP picture may be positioned at a start point of a CVS.

The inter-layer encoder 12 may encode an image as an RAP picture, wherein the image is not at a start point of a CVS and is from among pictures included in an enhancement layer. Therefore, the multilayer video encoding apparatus 10 may generate a bitstream, so that the RAP may be positioned in the middle of the CVS.

In operation S120, when an RASL picture related to the RAP picture encoded in operation S110 is not output, the inter-layer encoder 12 encodes an SPS that is activated in correspondence to decoding on the RAP picture.

The inter-layer encoder 12 may determine whether or not the RASL picture related to the RAP picture encoded in operation S110 is output. If the RASL picture related to the RAP picture encoded in operation S110 is not output, the inter-layer encoder 12 may set a value of NoRaslOutputFlag as 1.

If the RASL picture is not output, the inter-layer encoder 12 may encode the SPS that is activated in correspondence to decoding on the RAP picture.

For example, the inter-layer encoder 12 may encode the SPS that is activated when random access occurs in the RAP picture that is not at the start point of the CVS and is from among pictures of the enhancement layer.

The activated SPS may be information required to decode the CVS including the RAP picture in which the random access occurred.

The activated SPS may be information required to decode a layer including the RAP picture in which the random access occurred.

Also, the inter-layer encoder 12 may generate NoRaslOutputFlag. NoRaslOutputFlag is described above as a flag that indicates whether or not the RASL picture is output.

Figure 2A:
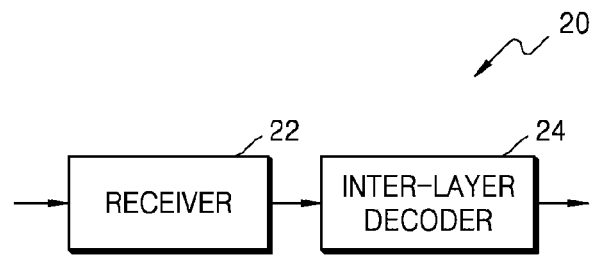
FIG. 2A illustrates a block diagram of a multilayer video decoding apparatus, according to an embodiment of the present invention.

FIG. 2A illustrates a block diagram of a multilayer video decoding apparatus, according to an embodiment of the present invention. A multilayer video decoding apparatus 20 according to the present embodiment includes a receiver 22 and the inter-layer decoder 24.

The multilayer video decoding apparatus 20 according to the present embodiment receives a base layer stream and an enhancement layer stream. Based on a scalable video coding method, the multilayer video decoding apparatus 20 may receive, as the base layer stream, the base layer stream including encoded data of base layer images, and may receive, as the enhancement layer stream, the enhancement layer stream including encoded data of enhancement layer images.

The multilayer video decoding apparatus 20 according to the present embodiment may decode a plurality of layer streams according to the scalable video coding method. The multilayer video decoding apparatus 20 according to the present embodiment may decode the base layer images by decoding the base layer stream, and may decode the enhancement layer images by decoding the enhancement layer stream.

For example, a multiview video may be encoded according to the scalable video coding method. For example, left-view images may be reconstructed by decoding a base layer stream, and right-view images may be reconstructed by decoding an enhancement layer stream. As another example, center-view images may be reconstructed by decoding a base layer stream. By further decoding a first enhancement layer stream in addition to the base layer stream, left-view images may be reconstructed. By further decoding a second enhancement layer stream in addition to the base layer stream, right-view images may be reconstructed.

As another example, the scalable video coding method may be performed according to temporal hierarchical prediction. Images with a base frame rate may be reconstructed by decoding the base layer stream. By further decoding the enhancement layer stream in addition to the base layer stream, images with a high-speed frame rate may be reconstructed.

Also, if three or more enhancement layer images exist, first enhancement layer images with respect to a first enhancement layer may be reconstructed from a first enhancement layer stream, and second enhancement layer images may be further reconstructed by further decoding a second enhancement layer stream. By further decoding a kth enhancement layer stream in addition to the first enhancement layer stream, kth enhancement layer images may be further reconstructed.

The multilayer video decoding apparatus 20 according to the present embodiment decodes each of blocks of each of images of a video. The block according to the present embodiment may be a largest coding unit, a coding unit, a prediction unit, a transformation unit, etc. from among coding units of a tree structure.

The multilayer video decoding apparatus 20 according to the present embodiment may obtain encoded data of the base layer images and the enhancement layer images from the base layer stream and the enhancement layer stream, and may further obtain a motion vector generated by inter prediction, and disparity information generated by inter-layer prediction.

The multilayer video decoding apparatus 20 according to the present embodiment may decode inter-predicted data of each of layers, and may decode data that is inter-layer predicted between a plurality of layers. The reconstruction may be performed by using motion compensation and inter-layer decoding, based on a coding unit or a prediction unit.

Images of each layer stream may be reconstructed by performing motion compensation that cross-reference images that are predicted via inter prediction on a same layer. The motion compensation means an operation of reconstructing a reconstructed image of the current image by synthesizing a reference image and a residual component of the current image, wherein the reference image is determined by using a motion vector of the current image.

Also, the multilayer video decoding apparatus 20 according to the present embodiment may perform the inter-layer decoding by referencing the base layer images, so as to reconstruct the enhancement layer image predicted via the inter-layer prediction. The inter-layer decoding means an operation of reconstructing a reconstructed image of the current image by synthesizing a reference image of another layer and the residual component of the current image, wherein the reference image is determined by using the disparity information of the current image.

The multilayer video decoding apparatus 20 according to the present embodiment may perform the inter-layer decoding so as to reconstruct the second enhancement layer images predicted by referencing the first enhancement layer images.

According to the present embodiment, base layer images and enhancement layer images may include RAP images at randomly-accessible points.

The inter-layer decoder 24 reconstructs the base layer images by decoding a received base layer stream. In more detail, entropy-decoding, inverse-quantization, and inverse-transformation are performed on symbols extracted by parsing the base layer stream, so that a residual component of the base layer images may be reconstructed.

The inter-layer decoder 24 may receive, via the receiver 22, a bitstream of quantized transformation coefficients of the base layer images. The inverse-quantization and the inverse-transformation are performed on the quantized transformation coefficients, so that the residual component of the base layer images may be reconstructed. The inter-layer decoder 24 may reconstruct the base layer images by performing motion compensation by cross-referencing the base layer images.

The inter-layer decoder 24 may decode, from the base layer stream, a quantized transformation coefficient of an I-type base layer RAP image and may reconstruct a base layer RAP image. The inter-layer decoder 24 according to the present embodiment may reconstruct, from the base layer images, I-type base layer RAP images without referencing another base layer image. The inter-layer decoder 24 according to the present embodiment may reconstruct pixels of blocks of the I-type base layer RAP image by performing intra prediction using neighbouring pixels of a current block in a same picture.

Also, the inter-layer decoder 24 may reconstruct the base layer images excluding the base layer RAP image via motion compensation by referencing other base layer images. The inter-layer decoder 24 may reconstruct the residual component of the base layer images excluding the base layer RAP image, may determine a reference image from among the base layer images, may compensate the reference image for the residual component, and thus may reconstruct the base layer images.

The inter-layer decoder 24 according to the present embodiment reconstructs enhancement layer images by decoding an enhancement layer stream. In more detail, entropy-encoding, inverse-quantization, and inverse-transformation are performed on symbols extracted by parsing the enhancement layer stream, so that a residual component of each block may be reconstructed. The inter-layer decoder 24 may directly receive a bitstream of a quantized transformation coefficient of the residual component, may perform the inverse-quantization and the inverse-transformation on the bitstream, and thus may reconstruct the residual component.

In order to decode the enhancement layer stream, the inter-layer decoder 24 according to the present embodiment may reconstruct the enhancement layer images via motion compensation referencing the base layer images reconstructed from the base layer stream, and inter-layer decoding referencing same layer images.

The inter-layer decoder 24 according to the present embodiment may reconstruct the enhancement layer images via the inter-layer decoding referencing the base layer images reconstructed by the inter-layer decoder 24. For a predetermined enhancement layer, current enhancement layer images may be reconstructed via inter-layer decoding referencing not only the base layer images but also referencing images of another enhancement layer not a current enhancement layer.

The motion compensation or the inter-layer decoding is available only when a reference target image was first reconstructed. However, a randomly-accessible RAP image does not reference another image of the same layer. Therefore, when random access occurs in the RAP image, even if there are no images that were first reconstructed in the same layer, the RAP image may be immediately decoded. In a multilayer prediction structure according to the present embodiment, when the RAP image exists from among the base layer images, an enhancement layer RAP image that corresponds to the base layer RAP image and is from among the enhancement layer images may be reconstructed.

Also, the inter-layer decoder 24 may reconstruct the enhancement layer images by performing motion compensation by referencing enhancement layer images of a same layer. In particular, the inter-layer decoder 24 according to the present embodiment may reconstruct the enhancement layer images by performing motion compensation by referencing an enhancement layer RAP image of the same layer.

For enhancement layer images not the RAP image, the inter-layer decoder 24 may reconstruct the enhancement layer images via inter-layer decoding referencing another layer image and motion compensation referencing same layer images.

In more detail, the inter-layer decoder 24 may decode an enhancement layer stream and thus may obtain a motion vector and a residual component of enhancement layer images excluding an enhancement layer RAP image. The inter-layer decoder 24 may determine, by using the motion vector, a reference image from among same layer images, may compensate the reference image for the residual component, and thus may reconstruct the enhancement layer images. By using a motion vector of a current block of a current image, a reference block from among the reference image may be determined.

In more detail, the inter-layer decoder 24 may decode the enhancement layer stream and thus may obtain disparity information and the residual component of the enhancement layer images excluding the enhancement layer RAP image. The inter-layer decoder 24 may determine, by using the disparity information, a reference image from among other layer images, may compensate the reference image for the residual component, and thus may reconstruct the enhancement layer images.

When the inter-layer decoder 24 according to the present embodiment decodes a plurality of enhancement layer streams, the inter-layer decoder 24 may decode the enhancement layer stream of each layer, and may reconstruct enhancement layer images of each layer. Hereinafter, for convenience of description, a decoding operation by the inter-layer decoder 24 to decode an enhancement layer stream is described as an operation with respect to an enhancement layer stream of one layer. However, the operation by the inter-layer decoder 24 is not performed only on the enhancement layer stream of one layer, thus, the operation may be equally performed on each of streams of other layers.

In order to reconstruct an enhancement layer image, the inter-layer decoder 24 according to the present embodiment may perform inter-layer decoding referencing base layer images and motion compensation referencing same layer reconstructed images.

While a first layer stream is decoded according to a multilayer prediction structure of the multilayer video decoding apparatus 20 according to the present embodiment, a second layer stream may be decoded due to layer switching. For example, when a view change occurs in a multiview image structure or a change occurs in a temporal layer in a temporal hierarchical prediction structure, the layer switching may be performed in the multilayer prediction structure. Even in this case, same layer images that were first reconstructed do not exist at a point of the layer switching, the inter prediction is not available.

The inter-layer decoder 24 may obtain encoded data of each image from each NAL unit. The inter-layer decoder 24 may parse NAL unit-type information and thus may determine whether a current image is a trailing picture, a TSA pictures, an STSA image, an RADL image, an RASL image, a BLA image, an IDR image, a CRA image, or a VLA image.

The inter-layer decoder 24 according to the present embodiment may separately perform random access on each layer. An RAP picture includes an IDR picture, a CRA picture, and a BLA picture. IDR pictures from among multilayer encoded images may be aligned or may not be aligned.

The inter-layer decoder 24 may receive a multilayer encoded image in which IDR pictures are aligned in all layers and may perform decoding. Pictures that are included in a same access unit and have an IDR NAL unit type may have a same POC.

For example, at a POC of a particular view, if an IDR picture is positioned in one layer from among a plurality of layers, the inter-layer decoder 24 may determine that pictures of all layers at a corresponding POC are all IDR pictures and may perform decoding accordingly. Even if inter prediction is not allowed, the inter-layer decoder 24 may perform inter-layer prediction and thus may decode the IDR picture.

Hereinafter, alignment may mean that same-type pictures are shown in all layers at a particular POC. For example, if pictures included in a same access unit are all IDR pictures, the pictures may be aligned. However, if one of pictures included in a same access unit is a RAP picture, and another one of the pictures is a non-RAP picture, the pictures may not be aligned.

A group of pictures having a same POC and included in different layers may be an access unit. Therefore, pictures included in a same access unit may have a same POC.

CRA pictures from among multilayer encoded images may not be aligned. Since a CRA NAL unit type can be used when nuh_layer_id is greater than 0, a CRA NAL unit can be shown in an enhancement layer. Although inter prediction cannot be performed on the CRA pictures, inter-layer prediction may be performed on CRA NAL units of the enhancement layer, wherein the CRA NAL units have nuh_layer_id that is greater than 0.

Also, the CRA NAL unit type may be used when nuh_layer_id is 0, and the CRA NAL units may be positioned in the middle of a CVS. Therefore, the CRA NAL unit type may be positioned in the middle of a CVS of a base layer. Alternatively, the CRA NAL unit type may be positioned in the middle of a CVS of an enhancement layer.

The CRA NAL units are not required to be aligned between layers. For example, one CRA NAL unit type may be used for all VCL NAL units having a particular nuh_layer_id value.

When bitstreams are spliced, all CRA pictures in an access unit may be changed to BLA pictures. A CRA picture of a base layer may be used as a random access point, and a CRA picture of an enhancement layer may be used as one of a layer switching point and a bitstream extraction point.

A first NAL unit of a layer becomes an IDR picture or a BLA picture at a splicing point, where the first NAL unit has a nuh_layer_id value that is greater than a maximum nuh_layer_id value of a previous NAL unit.

Also, when bitstreams are spliced, CRA NAL units of all layers at a layer switching point may be changed to BLA NAL unit.

A first NAL unit of a layer becomes an IDR picture or a BLA picture at a layer up-switching point, where the first NAL unit has a nuh_layer_id value that is greater than a maximum nuh_layer_id value of a previous NAL unit.

When a bitstream is extracted from an upper layer of a previous layer, CRA NAL units related to the upper layer at a layer switching point are changed to BLA NAL unit.

BLA pictures from among multilayer encoded images may not be aligned in all layers.

For example, a BLA NAL unit type may be used for VCL NAL units of a particular layer, and a unit type other than the BLA NAL unit type may be used for VCL NAL units of another layer in a same access unit.

Since the BLA NAL unit type can be used when nuh_layer_id is greater than 0, a BLA NAL unit may be shown in an enhancement layer. When bitstreams are spliced, all CRA pictures in an access unit may be changed to BLA pictures, and when layers are switched, CRA pictures of related layers may be changed to BLA pictures. A BLA picture may be used not only to inform splicing of the bitstreams but also to inform layer switching.

For example, when a bitstream is layer up-switched, CRA NAL units of a related upper layer may be changed to BLA NAL units.

When a bitstream is switched to an upper layer, a CRA NAL unit of the related upper layer may be changed to a BLA NAL unit. For example, when a base layer picture is switched to an enhancement layer picture, a CRA NAL unit of the enhancement layer picture may be changed to a BLA NAL unit. In order to make occurrence of layer switching from the base layer picture to the enhancement layer picture, the base layer picture and the enhancement layer picture have to be included in a same access unit, and the enhancement layer picture has to be an RAP picture. The layer switching cannot occur in an enhancement layer picture that is not the RAP picture. The fact that the enhancement layer picture is the RAP picture may be a condition of the occurrence of the layer switching.

The BLA picture positioned in the enhancement layer may be used for inter-layer prediction even if inter prediction is not allowed. Also, the CRA pictures positioned in the enhancement layer may be used when inter-layer prediction is performed, even if inter prediction is not allowed.

When a picture of the enhancement layer included in the same access unit as the base layer is the RAP picture, the layer switching from the base layer picture to the enhancement layer picture may occur. Also, layer up-switching may mean that the bitstream is layer-switched to an upper layer.

The inter-layer decoder 24 may independently decode an encoded enhancement layer image by using the CRA NAL unit in the enhancement layer. CRA pictures may not be inter-predicted but CRA pictures in the enhancement layer may be inter-layer predicted.

The inter-layer decoder 24 may use one CRA NAL unit type for all VCL NAL units having a particular nuh_layer_id value. When bitstreams are spliced, the inter-layer decoder 24 may change all CRA pictures in the access unit to BLA pictures. The inter-layer decoder 24 may use the CRA picture of the base layer as a random access point of the bitstream. The inter-layer decoder 24 may use the CRA picture of the enhancement layer as a layer switching point or a bitstream extraction point.

The BLA NAL unit may be shown in the enhancement layer. When bitstreams are spliced, the inter-layer decoder 24 may change all CRA pictures in the access unit to BLA pictures, and when layers are switched, the inter-layer decoder 24 may change CRA pictures of related layers to BLA pictures. A BLA picture may be used not only to inform splicing of the bitstreams but also to inform layer switching.

As described above, the inter-layer decoder 24 may process random access, splicing, bitstream extraction, and layer switching on layers independently of each other, by using an IDR picture, a CRA picture, and a BLA picture that are independently included with respect to each layer. For example, the inter-layer decoder 24 may perform decoding by independently activating a sequence parameter set (SPS) by using the IDR picture or the BLA picture of each layer. The decoding apparatus may use an IDR picture, a CRA picture, and a BLA picture of a base layer as a random access point, and may use an IDR picture, a CRA picture, and a BLA picture of an enhancement layer as one of a bitstream extraction point and a layer switching point.

The inter-layer decoder 24 converts all CRA pictures to BLA pictures, wherein the CRA pictures are included in an access unit of a point at which random access or splicing occurred. The inter-layer decoder 24 converts CRA pictures of layers to BLA pictures at a point where bitstream extraction and layer switching occurred, wherein the CRA pictures are newly transmitted after the bitstream extraction and the layer switching occurred. The inter-layer decoder 24 may splice layers independently of each other.

When random access occurs in a multilayer video image that is not aligned, the inter-layer decoder 24 may decode the image via layer switching.

A CVS is a coded video sequence, and when a start position of the CVS is decoded, an SPS may be activated. However, the SPS may be activated at a position that is not the start position of the CVS.

For example, when the layer switching or the random access occurred in the middle of the CVS, the SPS may be activated at the position that is not the start position of the CVS.

As another example, when NoRaslOutputFlag is 1, even if an RAP picture positioned in an enhancement layer is not at a start position of a CVS, an SPS of a related layer may be activated. Alternatively, when NoRaslOutputFlag is 1, even if an RAP picture positioned in an enhancement layer is not at a start position of a CVS, an SPS of a related CVS may be activated. Details thereof are described later with reference to FIG. 2C.

A RASL picture may not be decoded when random access is performed. Therefore, the inter-layer decoder 24 may discard the RASL picture that cannot be decoded when decoding is performed due to occurrence of the random access. For example, the inter-layer decoder 24 may discard a RASL picture related to a RAP picture to which random access occurred.

Also, when RASL pictures are discarded, all pictures that reference the discarded RASL pictures may be discarded. Details thereof are described later with reference to FIG. 2D.

The inter-layer decoder 24 may immediately update, whenever a POC value is changed, an LSB of a POC value so as to correspond to the changed POC value. The inter-layer decoder 24 may update an MSB of the POC value in a manner that, whenever the LSB of the POC value passes through one cycle, 1 is added to the MSB of the POC value.

In a case where the MSB of the POC value is updated in the aforementioned manner, if random access occurs in the base layer, the inter-layer decoder 24 may set the MSB of the POC value as 0. Also, PicOrderCntMsb may mean a parameter indicating the MSB of the POC value. Details thereof are described later with reference to FIG. 2E.

However, even if NoRaslOutputFlag is 1, PicOrderCnt-Msb of a RAP picture in the enhancement layer may not be set as 0. Details thereof are described later with reference to FIG. 2F.

Figure 2B:
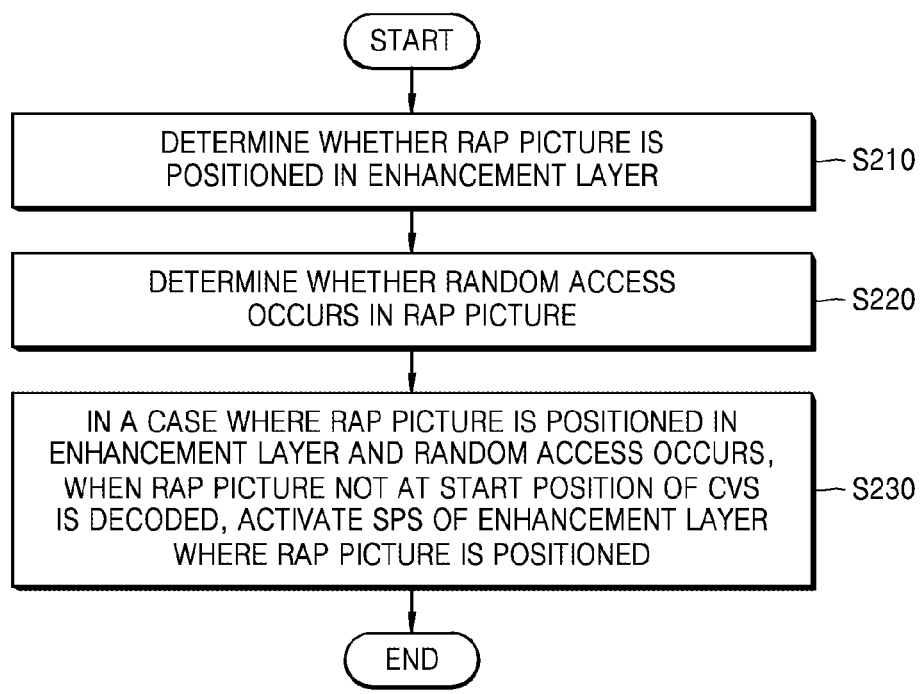
FIG. 2B illustrates a flowchart of a multilayer video decoding method by the multilayer video decoding apparatus of FIG. 2A.

FIG. 2B illustrates a flowchart of a multilayer video decoding method by the multilayer video decoding apparatus 20 of FIG. 2A.

The receiver 22 may receive a datastream. The datastream that the receiver 22 receives may consist of network abstraction layer (NAL) units.

The NAL unit may mean a network abstraction layer unit that is a basic unit configuring a bitstream. Also, one or more NAL units may configure a datastream. The receiver 22 may externally receive the datastream consisting of one or more network abstraction layer (NAL) units.

The inter-layer decoder 24 may separate the datastream into the NAL units by using the received datastream, and may decode each of the separated NAL units.

Each NAL unit may include two-byte header information. The inter-layer decoder 24 may check rough information about data in each NAL unit by decoding the two-byte header information included in each NAL unit.

In operation S210, the inter-layer decoder 24 determines whether an RAP picture is positioned in an enhancement layer.

For example, the inter-layer decoder 24 may determine, by using information received by the receiver 22, whether a decoding target RAP picture has a layer identifier nuh_layer_id that is greater than 0.

In operation S220, the inter-layer decoder 24 determines whether a RASL picture related to a RAP picture is output.

For example, the inter-layer decoder 24 may determine whether a RASL picture related to the decoding target RAP picture is output. The inter-layer decoder 24 may determine a value of NoRaslOutputFlag of the decoding target RAP picture.

As another example, the inter-layer decoder 24 may determine whether random access occurs in the decoding target RAP picture. Alternatively, the inter-layer decoder 24 may determine whether splicing occurs in the decoding target RAP picture. Alternatively, the inter-layer decoder 24 may determine whether layer switching occurs in the decoding target RAP picture. Alternatively, the inter-layer decoder 24 may determine whether the decoding target RAP picture is a picture where decoding starts.

In operation S230, in a case where the RAP picture is positioned in the enhancement layer, and the RASL picture is determined not to be output, when the inter-layer decoder 24 decodes a RAP picture not at a start position of a CVS, the inter-layer decoder 24 activates an SPS corresponding to the RAP picture.

For example, in a case where the RASL picture is determined not to be output, when the inter-layer decoder 24 decodes the RAP picture that is not at the start position of the CVS and is from among RAP pictures in the enhancement layer, the inter-layer decoder 24 may activate an SPS of the CVS including the decoding target RAP picture.

One SPS may correspond to one layer or at least two SPSs may correspond to one layer. One SPS may correspond to one CVS.

A CVS is a coded video sequence, and when a start position of the CVS is decoded, an SPS may be activated. However, the SPS may be activated at a position that is not the start position of the CVS. Detailed descriptions thereof are provided later.

FIGS. 2C through 2F illustrate inter-layer and multilayer prediction structures related to a method of decoding a video when random access occurs.

In FIGS. 2C through 2F, a square with oblique lines 31 may indicate a RAP picture, and a square without oblique lines 32 may indicate a non-RAP picture.

Figure 2C:
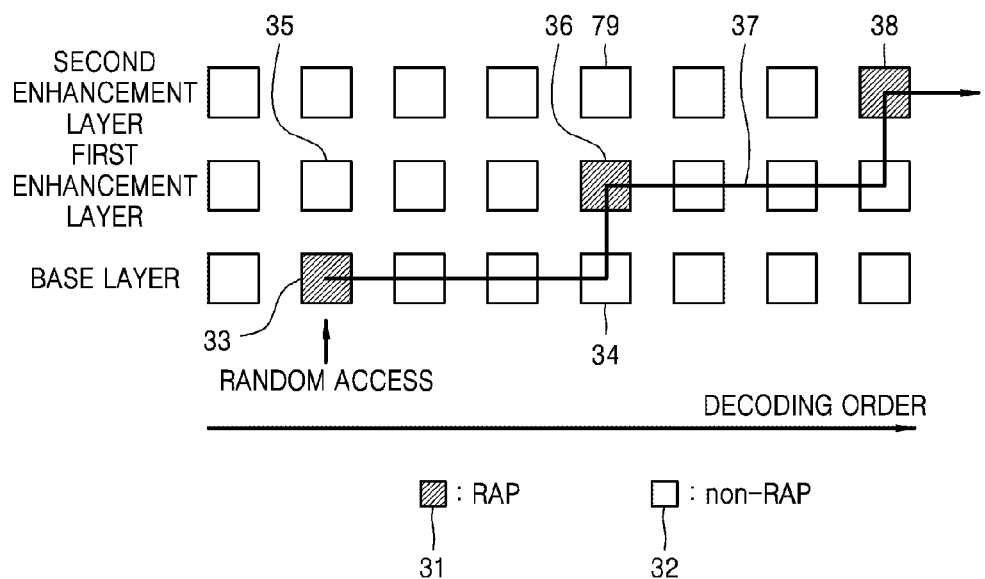
FIGS. 2C through 2F illustrate inter-layer and multilayer prediction structures related to a method of decoding a video when random access occurs.

FIG. 2C illustrates a decoding method when random access occurs in a multilayer video image that is not aligned, according to an embodiment. An arrow 37 indicates a flow along with decoding proceeds.

A multilayer may include one base layer and one or more enhancement layers. When random access occurs with respect to a multilayer image sequence, in order to decode a RAP picture that is positioned in an enhancement layer and is not at a start point of a CVS, the inter-layer decoder 24 may activate an SPS corresponding to a decoding target RAP picture.

Random access may occur in a picture 33 in the base layer. Since the picture 33 is a RAP picture, even if random access occurred, the inter-layer decoder 24 may decode the picture 33. However, a picture 35 of a first enhancement layer included in a same access unit as the picture 33 in which the random access occurred is not a RAP picture. Therefore, the picture 35 of the first enhancement layer cannot be decoded.

However, when a picture 34 of the base layer is decoded as decoding proceeds, since a picture 36 of the first enhancement layer included in a same access unit as the picture 34 of the base layer is a RAP picture, the picture 36 may be decoded. Therefore, after the picture 36 of the first enhancement layer is decoded, the inter-layer decoder 24 may perform decoding on other pictures of the first enhancement layer. Therefore, layer switching occurs while the picture 34 of the base layer is decoded.

However, since a picture 79 of a second enhancement layer of an access unit including the picture 34 of the base layer and the picture 36 of the first enhancement layer is a non-RAP picture, even if random access occurs in the picture 36 of the first enhancement layer, the inter-layer decoder 24 cannot decode the picture 79 of the second enhancement layer.

For occurrence of layer switching from the picture 34 of the base layer to the picture 36 of the first enhancement layer, the picture 34 of the base layer and the picture 36 of the first enhancement layer have to be included in a same access unit, and the picture 36 of the first enhancement layer has to be a RAP picture.

When layer switching occurs, RASL pictures from among pictures of the first enhancement layer which are decoded after the picture 36 of the first enhancement layer cannot be decoded. It is because the RASL pictures of the first enhancement layer which are decoded after the picture 36 of the first enhancement layer reference a picture that is decoded before the picture 36 of the first enhancement layer.

When the inter-layer decoder 24 does not output the RASL picture, the inter-layer decoder 24 may generate a flag indicating that the RASL picture is not output. For example, when the inter-layer decoder 24 does not output a RASL picture related to a predetermined RAP picture, the inter-layer decoder 24 may set a value of NoRaslOutputFlag as 1. When the value of NoRaslOutputFlag is 1, the inter-layer decoder 24 may not perform decoding on the RASL picture related to the predetermined RAP picture.

When the inter-layer decoder 24 decodes a start picture of a CVS, the inter-layer decoder 24 may activate an SPS. However, if some conditions are satisfied, when a middle picture of the CVS is decoded, an SPS may be activated.

For example, when the inter-layer decoder 24 decodes a RAP picture that is from among pictures in the enhancement layer and whose NoRaslOutputFlag is 1, even if the decoding target RAP picture is positioned in the middle of the CVS, the inter-layer decoder 24 may activate an SPS corresponding to the decoding target RAP picture.

As another example, each layer's RAP NAL unit whose NoRaslOutputFlag is 1 may independently activate an SPS of a corresponding layer.

As another example, when NoRaslOutputFlag is 1, even if a RAP picture positioned in the enhancement layer is not at a start position of a new CVS, an SPS of a related layer may be activated. Alternatively, when NoRaslOutputFlag is 1, even if a RAP picture positioned in the enhancement layer is not at a start position of a new CVS, an SPS of a related CVS may be activated.

One SPS may correspond to one layer or a plurality of SPSs may correspond to one layer. However, one SPS may correspond to one CVS. Therefore, an SPS that is activated when a picture positioned in the middle of a CVS is decoded may correspond to a layer to which a decoding target picture belongs, or may correspond to a CVS to which a decoding target picture belongs.

When layer switching occurs, NoRaslOutputFlag of the picture 36 of the first enhancement layer may be 1. Also, when the layer switching occurs, the picture 36 of the first enhancement layer may not be a picture where a CVS starts. However, even if a position of the picture 36 of the first enhancement layer is at the middle of the CVS, when NoRaslOutputFlag is 1, the inter-layer decoder 24 may decode the picture 36 of the first enhancement layer and may activate an SPS. When the inter-layer decoder 24 activates the SPS, the inter-layer decoder 24 may activate the SPS corresponding to the CVS to which the picture 36 of the first enhancement layer belongs. Alternatively, when the inter-layer decoder 24 activates the SPS, the inter-layer decoder 24 may activate the SPS corresponding to a layer to which the picture 36 of the first enhancement layer belongs.

Also, nuh_layer_id of the enhancement layer may be greater than 0. Also, nuh_layer_id may be signaled via a NAL unit header.

Figure 2D:
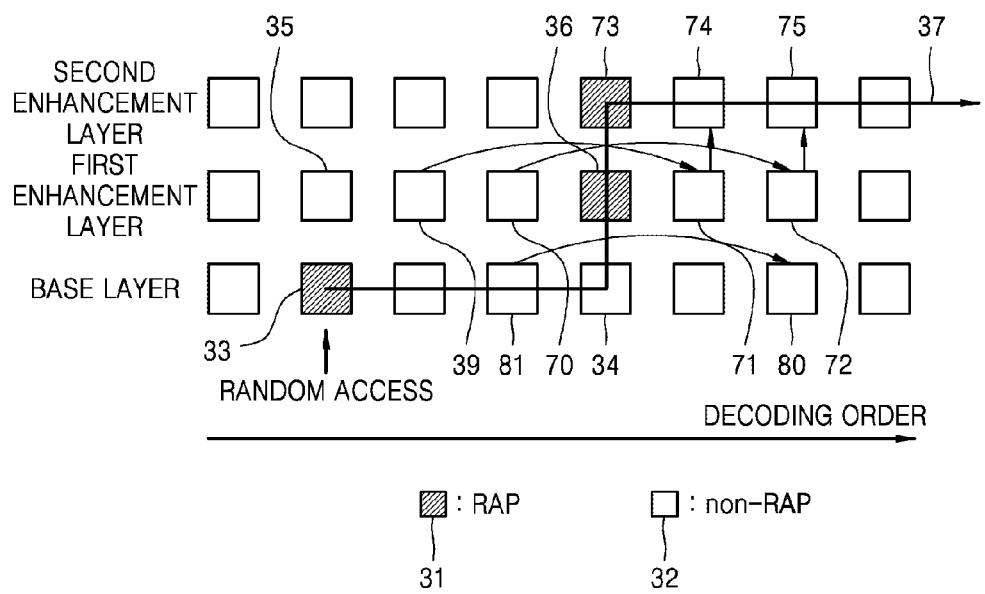

FIG. 2D illustrates a decoding method related to a RASL picture and a picture that references the RASL picture when NoRaslOutputFlag is 1 in a multilayer video image that is not aligned, according to an embodiment.

The inter-layer decoder 24 may discard the RASL picture before the RASL picture is decoded, wherein the RASL picture cannot be decoded when NoRaslOutputFlag is 1 in the multilayer video image that is not aligned. Also, when the inter-layer decoder 24 discards the RASL picture that cannot be decoded, the inter-layer decoder 24 may also discard the picture that references the discarded RASL picture.

In a multilayer of FIG. 2D, a base layer picture 33 in which random access occurs is a RAP picture, but an enhancement layer picture 35 included in a same access unit as the base layer picture 33 is a non-RAP picture, therefore, the multilayer is a non-aligned multilayer.

However, since a first enhancement layer picture 36 and a second enhancement layer picture 73 included in a same access unit as a base layer picture 34 are all RAP pictures, when the base layer picture 34 is decoded, the first enhancement layer picture 36 and the second enhancement layer picture 73 may be decoded. When the base layer picture 34 is decoded, layer up-switching may occur.

The RASL picture may not be decoded when random access occurs. It is because the RASL picture that is decoded after a randomly-accessed RAP picture is decoded references a picture that is decoded before the randomly-accessed RAP picture is decoded.

For example, since the first enhancement layer picture 36 is the RAP picture, the first enhancement layer picture 36 may be decoded. However, an RASL picture 71 that is decoded after the first enhancement layer picture 36 is decoded cannot be decoded. It is because the RASL picture 71 that is decoded after the first enhancement layer picture 36 is decoded references a picture 39 that is decoded before the first enhancement layer picture 36 is decoded.

Therefore, when the inter-layer decoder 24 performs decoding due to occurrence of random access, the inter-layer decoder 24 may discard the RASL picture. Alternatively, when the inter-layer decoder 24 performs decoding due to occurrence of random access, the inter-layer decoder 24 may discard a RASL picture in the enhancement layer.

For example, the inter-layer decoder 24 may discard the RASL picture 71 referencing the reference picture 39, and a RASL picture 72 referencing a reference picture 70.

A nuh_layer_id value of each of the RASL picture and a RADL NAL unit may be greater than 0. Therefore, the RASL picture may always be positioned in the enhancement layer.

RASL pictures related to a RAP picture in the enhancement layer may be discarded before decoding is performed. For example, the inter-layer decoder 24 may discard RASL pictures that are decoded after a BLA picture in the enhancement layer is decoded.

For example, the inter-layer decoder 24 may discard RASL pictures before decoding is performed, wherein the RASL pictures are related to a BLA picture whose nuh_layer_id is greater than 0.

As another example, when bitstreams are spliced, CRA pictures of all layers at a layer switching point may be changed to BLA pictures, and RASL pictures related to a BLA picture positioned in the base layer or the enhancement layer may be discarded before decoding is performed.

As another example, when a bitstream is randomly accessed, CRA pictures of all layers at a random access point may be changed to BLA pictures, and RASL pictures related to a BLA picture positioned in the base layer or the enhancement layer may be discarded before decoding is performed.

As another example, when a bitstream first starts, if a starting picture is a RAP picture, RASL pictures related to a BLA picture positioned in the base layer or the enhancement layer may be discarded before decoding is performed.

When the RASL pictures are discarded, all pictures that reference the discarded RASL pictures may be discarded. For example, when the RASL pictures are discarded, all pictures that reference the discarded RASL pictures for inter-layer prediction and are positioned in another layer may be discarded. As another example, when the RASL pictures are discarded, all pictures that reference the discarded RASL pictures for inter-layer prediction and are positioned in an upper layer may be discarded. (Translation) A layer whose nuh_layer_id value is greater than a current layer may be referred to as an upper layer.

When layer up-switching occurs as described above, the RASL pictures 71 and 72 that belong to the enhancement layer may be discarded before decoding is performed, but a RASL picture 80 that belongs to the base layer may not be discarded. The RASL picture 80 that belongs to the base layer references a picture 81 before occurrence of layer up-switching, and in this regard, the picture 81 before occurrence of layer up-switching has been decoded and thus may be referenced, thus, the RASL picture 80 that belongs to the base layer may not be discarded.

For example, when a bitstream is extracted from an upper layer of a previous layer, CRA NAL units related to the upper layer at a layer switching point are changed to BLA NAL unit, and RASL pictures related to a BLA picture positioned in the enhancement layer may be discarded before decoding is performed.

Figure 2E:
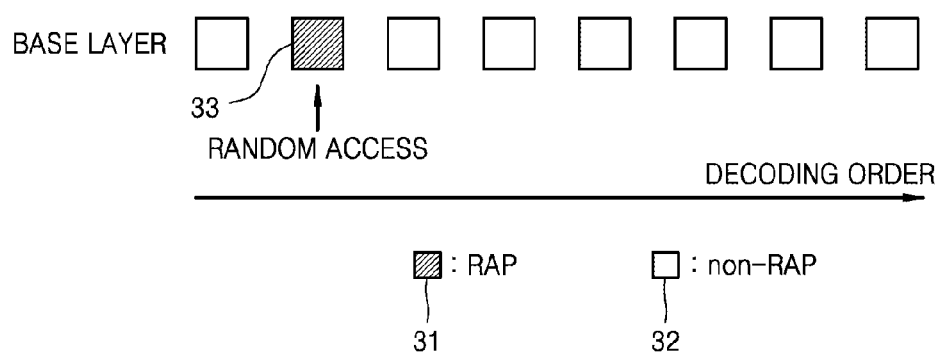

FIG. 2E illustrates a method of determining a POC when NoRaslOutputFlag is 1 in a base layer video image, according to an embodiment.

A POC is a parameter to count a picture order, and a relative temporal distance between pictures may be expressed via a POC of each of pictures existing in a same CVS.

When a POC value is expressed in a bit form, a value corresponding to an upper bit may be expressed as an MSB, and a value corresponding to a lower bit may be expressed as an LSB.

The inter-layer decoder 24 may immediately update, whenever a POC value is changed, an LSB of a POC value so as to correspond to the changed POC value. However, the inter-layer decoder 24 may not immediately update, when the POC value is changed, the LSB of the POC value so as to correspond to the changed POC value. The inter-layer decoder 24 may update an MSB of the POC value in a manner that, whenever the LSB of the POC value passes through one cycle, 1 is added to the MSB of the POC value.

Since the MSB of the POC value is set in a manner that, whenever the LSB of the POC value passes through one cycle, 1 is added to the MSB of the POC value, when random access occurs in the base layer, the inter-layer decoder 24 may set an MSB of a POC value with respect to a new picture so as to allow the MSB of the POC value to correspond to a POC value of the picture before the random access occurs.

Therefore, when the random access occurs in the base layer, the inter-layer decoder 24 may set the MSB of the POC value as 0. The MSB of the POC value may be stored as PicOrderCntMsb, and an LSB of the POC value may be stored as PicOrderCntLsb.

If NoRaslOutputFlag of a current picture is 1, and the current picture is a RAP picture positioned in the base layer, the inter-layer decoder 24 may reset PicOrderCntMsb as 0. Therefore, when NoRaslOutputFlag is 1, PicOrderCntMsb of the RAP picture of the base layer may be set as 0.

Figure 2F:
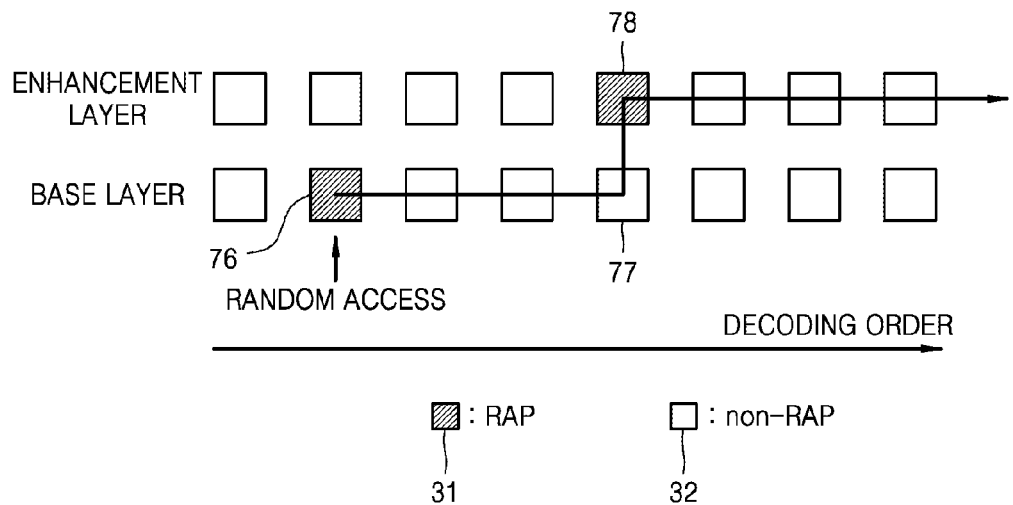

However, as will be described later with reference to FIG. 2F, PicOrderCntMsb of an RAP picture in an enhancement layer may not be set as 0 even if NoRaslOutputFlag is 1.

2F illustrates a method of determining a POC in an enhancement layer when NoRaslOutputFlag is 1 in a multilayer video image, according to an embodiment.

When NoRaslOutputFlag is 1, a RAP picture positioned in the enhancement layer may not reset PicOrderCntMsb as 0. For example, PicOrderCntMsb of an encoded picture positioned in the enhancement layer may be set to be equal to PicOrderCntMsb of an encoded picture of a base layer.

For example, when the inter-layer decoder 24 decodes a base layer picture 77, layer up-switching may occur.

Since layer up-switching occurred, NoRaslOutputFlag of an enhancement layer picture 78 may be 1. Also, the enhancement layer picture 78 is a RAP picture. However, PicOrderCntMsb of the enhancement layer picture 78 may not be reset as 0.

In addition, PicOrderCntMsb of the enhancement layer picture 78 may be set to be equal to PicOrderCntMsb of the base layer picture 77 included in a same access unit as the enhancement layer picture 78.

Also, PicOrderCntLsb of the enhancement layer picture 78 may be set to be equal to PicOrderCntLsb of the base layer picture 77 included in a same access unit as the enhancement layer picture 78.

With reference to FIGS. 2A through 2F, various embodiments in which the multilayer video decoding apparatus 20 performs decoding are described, however, it will be obvious to one of ordinary skill in the art that the methods described with reference to FIGS. 2A through 2F may also be performed by the multilayer video encoding apparatus 10.

Figure 3:
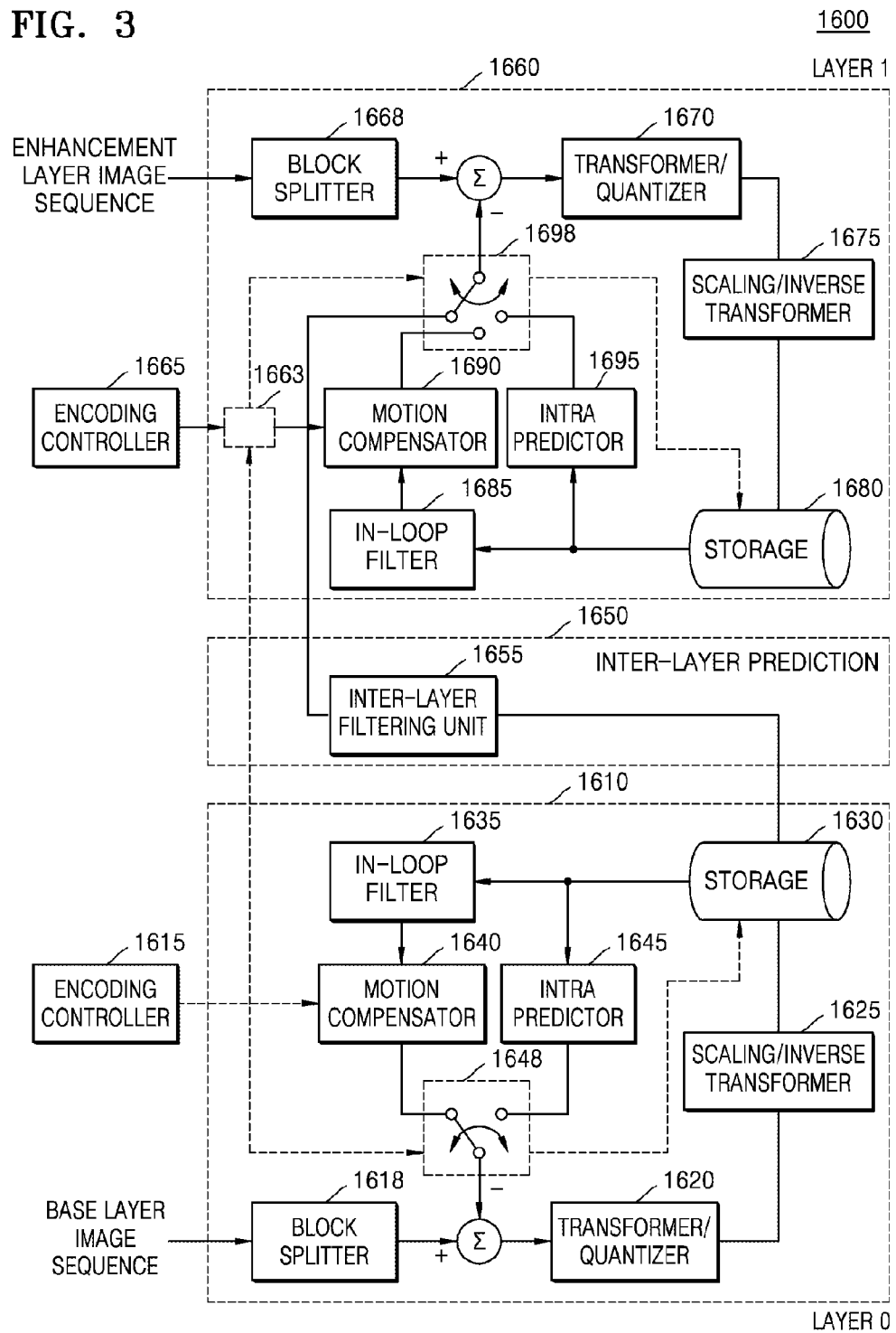
FIG. 3 illustrates an inter-layer prediction structure, according to an embodiment.

FIG. 3 illustrates an inter-layer prediction structure, according to an embodiment.

An inter-layer encoding system 1600 includes a base layer encoding terminal 1610, an enhancement layer encoding terminal 1660, and an inter-layer prediction terminal 1650 between the base layer encoding terminal 1610 and the enhancement layer encoding terminal 1660. The base layer encoding terminal 1610 and the enhancement layer encoding terminal 1660 may illustrate detailed configurations of a base layer encoder 1410 and an enhancement layer encoder 1420, respectively.

The base layer encoding terminal 1610 receives an input of a base layer image sequence and encodes each image. The enhancement layer encoding terminal 1660 receives an input of an enhancement layer image sequence and encodes each image. Operations that overlap in operations of the base layer encoding terminal 1610 and operations of the enhancement layer encoding terminal 1660 are simultaneously described below.

A block splitter 1618 or 1668 splits an input image (a low resolution image or a high resolution image) to a largest coding unit, a coding unit, a prediction unit, a transformation unit, etc. In order to encode the coding unit that is output from the block splitter 1618 or 1668, intra prediction or inter prediction may be performed with respect to each prediction unit of the coding unit. A prediction switch 1648 or 1698 may perform the inter prediction by referencing a reconstructed previous image output from a motion compensator 1640 or 1690 or may perform the intra prediction by using a neighbouring prediction unit of a current prediction unit in a current input image output from an intra predictor 1645 or 1695, based on whether a prediction mode of the prediction unit is an intra prediction mode or an inter prediction mode. Residual information may be generated with respect to each prediction unit via the inter prediction.

Residual information between the prediction unit and a peripheral image is input to a transformer/quantizer 1620 or 1670, according to each prediction unit of the coding unit. The transformer/quantizer 1620 or 1670 may perform transformation and quantization with respect to each transformation unit, based on the transformation unit of the coding unit, and may output a quantized transformation coefficient.

A scaling/inverse transformer 1625 or 1675 may perform scaling and inverse-transformation on the quantized transformation coefficient, according to each transformation unit of the coding unit, and may generate residual information of a spatial domain. When it is controlled to an inter mode due to the prediction switch 1648 or 1698, the residual information may be synthesized with the reconstructed previous image or the neighbouring prediction unit, so that a reconstructed image including the current prediction unit may be generated and a reconstructed current image may be stored in a storage 1630 or 1680. The reconstructed current image may be transferred to the intra predictor 1645 or 1695/the motion compensator 1640 or 1690, according to a prediction mode of a prediction unit to be next encoded.

In particular, during the inter mode, an in-loop filter 1635 or 1685 may perform at least one of deblocking filtering and Sample Adaptive Offset (SAO) filtering on the reconstructed image stored in the storage 1630 or 1680, according to each coding unit. At least one of the deblocking filtering and the SAO filtering may be performed on the coding unit and at least one of a prediction unit and a transformation unit included in the coding unit.

The deblocking filtering is filtering for smoothing a blocking phenomenon of a data unit, and the SAO filtering is filtering for compensating for a pixel value that has been corrupted while data is encoded and decoded. Data that is filtered by the in-loop filter 1635 or 1685 may be transferred to the motion compensator 1640 or 1690, according to each prediction unit. In order to encode a next coding unit output from the block splitter 1618 or 1668, residual information between the reconstructed current image and the next coding unit may be generated, wherein the reconstructed current image is output from the motion compensator 1640 or 1690 and the next coding unit is output from the block splitter 1618 or 1668.

In this manner, the aforementioned encoding procedure may be repeated with respect to each coding unit of the input image.

Also, for inter-layer prediction, the enhancement layer encoding terminal 1660 may refer to the reconstructed image stored in the storage 1630 of the base layer encoding terminal 1610. An encoding controller 1615 of the base layer encoding terminal 1610 may control the storage 1630 of the base layer encoding terminal 1610, and may transfer the reconstructed image of the base layer encoding terminal 1610 to the enhancement layer encoding terminal 1660. In the inter-layer prediction terminal 1650, an in-loop filtering unit 1655 may perform at least one of the deblocking filtering, the SAO filtering, and ALF filtering on a reconstructed base layer image output from the storage 1630 of the base layer encoding terminal 1610. When a base layer and an enhancement layer have different resolutions, the inter-layer prediction terminal 1650 may upsample the reconstructed base layer image and may transfer an upsampled reconstructed base layer image to the enhancement layer encoding terminal 1660. When the inter-layer prediction is performed according to a control by the switch 1698 of the enhancement layer encoding terminal 1660, the inter-layer prediction may be performed on an enhancement layer image by referencing the reconstructed base layer image that is transferred via the inter-layer prediction terminal 1650.

In order to encode an image, various encoding modes for a coding unit, a prediction unit, and a transformation unit may be set. For example, as an encoding mode for the coding unit, a depth, split information (e.g., a split flag), or the like may be set. As an encoding mode for the prediction unit, a prediction mode, a partition type, intra direction information, reference list information, or the like may be set. As an encoding mode for the prediction unit, a transformation depth, split information or the like may be set.

The base layer encoding terminal 1610 may perform encoding by using each of various depths for the coding unit, each of various modes for the prediction unit, each of various partition types, each of various intra directions, each of various reference lists, and each of various transformation depths for the transformation unit, and according to results of the performances, the base layer encoding terminal 1610 may determine an encoding depth, a prediction mode, a partition type, intra direction/reference list, a transformation depth, etc. that have the highest encoding efficiency. However, an encoding mode determined by the base layer encoding terminal 1610 is not limited to the aforementioned encoding modes.

The encoding controller 1615 of the base layer encoding terminal 1610 may control various encoding modes to be appropriately applied to operations of each configuring element. Also, for inter-layer encoding in the enhancement layer encoding terminal 1660, the encoding controller 1615 may control the enhancement layer encoding terminal 1660 to determine an encoding mode or residual information by referring to the encoding results from the base layer encoding terminal 1610.

For example, the enhancement layer encoding terminal 1660 may use an encoding mode of the base layer encoding terminal 1610 as an encoding mode for the enhancement layer image, or may determine the encoding mode for the enhancement layer image by referring to an encoding mode of the base layer encoding terminal 1610. The encoding controller 1615 of the base layer encoding terminal 1610 may use a current encoding mode from the encoding mode of the base layer encoding terminal 1610 so as to determine a current encoding mode of the enhancement layer encoding terminal 1660 by controlling a control signal of the encoding controller 1665 of the enhancement layer encoding terminal 1660.

Similar to the multilayer encoding system 1600 based on an inter-layer prediction technique shown in FIG. 3, an inter-layer decoding system based on the inter-layer prediction technique may be embodied. That is, the inter-layer decoding system for a multilayer video may receive a base layer bitstream and an enhancement layer bitstream. A base layer decoding terminal of the inter-layer decoding system may decode the base layer bitstream and may reconstruct base layer images. An enhancement layer decoding terminal of the inter-layer decoding system for the multilayer video may decode the enhancement layer bitstream by using a reconstructed base layer image and parsed encoding information and may reconstruct enhancement layer images.

Figure 4A:
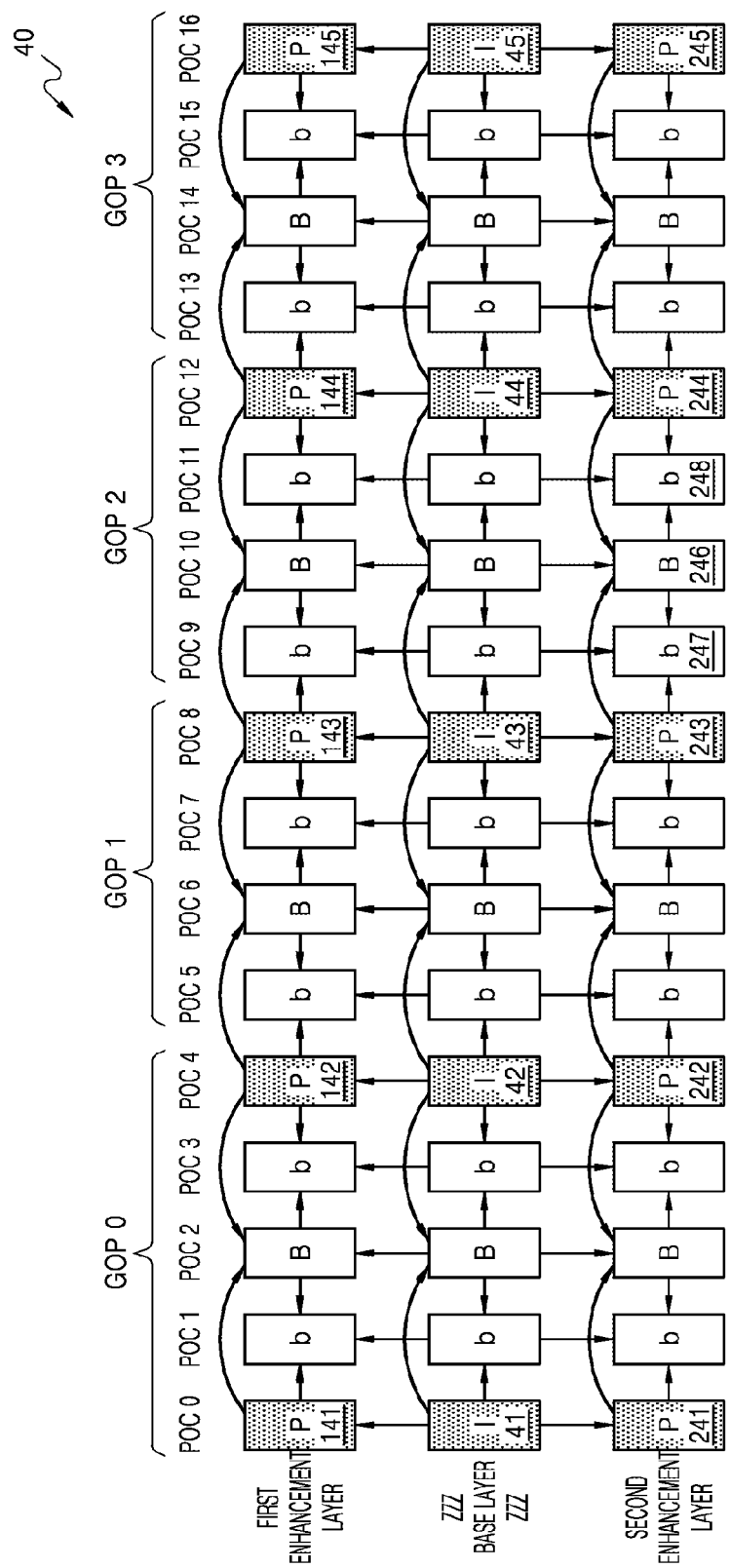
FIG. 4A illustrates a multilayer prediction structure of multilayer images.

FIG. 4A illustrates a multilayer prediction structure 40 of multilayer images.

In the multilayer prediction structure 40 shown in FIG. 4A, images are arrayed according to reproduction order POC. According to reproduction order and reconstruction order of the multilayer prediction structure 40, images of a same layer are arrayed in a horizontal direction.

Also, images having a same POC value are arrayed in a vertical direction. A POC value of an image indicates reproduction order of images configuring a video. 'POC X' shown in the multilayer prediction structure 40 indicates relative reproduction order of images positioned in a corresponding column, and when a value of X is decreased, reproduction order precedes, whereas the value of X is increased, reproduction order is followed.

Accordingly, according to reproduction order of the multilayer prediction structure 40, images of each layer are arrayed in a horizontal direction according to POC values (reproduction order). Also, first and second enhancement layer images positioned in a same column as a base layer image have a same POC value (reproduction order).

In each layer, four consecutive images configure one group of picture (GOP). Each GOP includes images between sequential anchor pictures, and one anchor picture.

An anchor picture indicates a random access point, and while a video is reproduced, when a reproduction position is randomly selected from among images that are arrayed according to video reproduction order, i.e., POC values, an anchor picture whose POC order is most adjacent to the reproduction position is reproduced. Base layer images include base layer anchor pictures 41, 42, 43, 44, and 45, first enhancement layer images include first enhancement layer anchor pictures 141, 142, 143, 144, and 145, and second enhancement layer images include second enhancement layer anchor pictures 241, 242, 243, 244, and 245.

Multilayer images may be reproduced and predicted (reconstructed) according to GOP order. First, according to reproduction order and reconstruction order of the multilayer prediction structure 40 of FIG. 4A, in each layer, images included in GOP 0 may be reconstructed and reproduced, and then images included in GOP 1 may be reconstructed and reproduced. That is, in order of GOP 0, GOP 1, GOP 2, and GOP 3, images included in each GOP may be reconstructed and reproduced.

According to reproduction order and reconstruction order of the multilayer prediction structure 40, inter-layer prediction and inter prediction are performed in images. In the multilayer prediction structure 40, an image where an arrow starts is a reference image, and another image where the arrow ends is an image that is predicted by referencing the reference image.

In particular, according to reconstruction order of the multilayer prediction structure 40, images are arrayed in a horizontal order according to prediction (reproduction) order of each of the images. That is, images that are positioned relatively to the left are first-predicted (reconstructed) images, and images that are positioned relatively to the right are second-predicted (reconstructed) images. Since next images are predicted (reconstructed) by referencing first-reconstructed images, all arrows indicating prediction directions between same layer images in reconstruction order of the multilayer prediction structure 40 are forward from the images positioned relatively to the left toward the images positioned relatively to the right.

A prediction result with respect to the base layer images may be output in the form of a base layer stream. Also, a prediction-encoding result with respect to the first enhancement layer images may be output in the form of a first enhancement layer stream, and a prediction-encoding result with respect to the second enhancement layer images may be output in the form of a second enhancement layer stream.

Only inter prediction is performed on the base layer images. That is, the I-type anchor pictures 41, 42, 43, 44, and 45 do not reference other images, but rest of images that are B-type and b-type are predicted by referencing other base layer images. The B-type images are predicted by referencing an I-type anchor picture having a preceding POC value and another I-type picture that is followed. The b-type images are predicted by referencing an I-type anchor picture having a preceding POC value and a B-type image that is followed, or by referencing a B-type image having a preceding POC value and an I-type anchor picture that is followed.

With respect to the first enhancement layer images and the second enhancement layer images, inter-layer prediction referencing the base layer images, and inter prediction referencing same-view images are performed.

Similar to the base layer image, inter-image prediction is performed on the first enhancement layer images, and inter-prediction is performed on the second enhancement layer images. The anchor pictures 141, 142, 143, 144, 145, 241, 242, 243, 244, and 245 from among the first enhancement layer images and the second enhancement layer images do not reference same layer images, and rest of images other than the anchor pictures may be predicted by referencing same layer images.

However, the anchor pictures 141, 142, 143, 144, 145, 241, 242, 243, 244, and 245 from among the first enhancement layer images and the second enhancement layer images are P-type images that reference the base layer anchor pictures 41, 42, 43, 44, and 45 having same POC values.

With respect to other images that exclude the anchor pictures 141, 142, 143, 144, 145, 241, 242, 243, 244, and 245 and are from among the first enhancement layer images and the second enhancement layer images, not only inter prediction but also inter-layer prediction that reference a base layer image having a same POC may be performed, thus, they are B-type images or b-type images.

A reproduction procedure for reproducing images is similar to a prediction procedure. However, only after a reference image of each image is reconstructed, each image may be reconstructed by using the reconstructed reference image.

First, each image of the base layer images may be reconstructed via motion compensation. When the I-type base layer anchor pictures 41, 42, 43, 44, and 45 are reconstructed, B-type base layer images may be reconstructed via motion compensation that references the base layer anchor pictures 41, 42, 43, 44, and 45. Also, b-type base layer images may be reconstructed via motion compensation that references I-type or B-type base layer reconstructed images.

Each of the first enhancement layer images and the second enhancement layer images are encoded via inter-layer prediction referencing the base layer images, and inter prediction referencing same layer images.

That is, for a process of reconstructing the first enhancement layer images, inter-layer disparity compensation that references the base layer images that are reconstructed after a base-view reference image is reconstructed is performed, so that the first enhancement layer images may be reconstructed. Also, after a reference image of the first enhancement layer is reconstructed, the first enhancement layer images may be reconstructed via motion compensation that references a reconstructed reference image of the first enhancement layer.

Also, the base-view reference image is reconstructed, the second enhancement layer images may be reconstructed via inter-layer disparity compensation that references the base-view reference image. After a reference image of the second enhancement layer is reconstructed, the second enhancement layer images may be reconstructed via motion compensation that references a reconstructed reference image of the second enhancement layer.

Figure 4B:
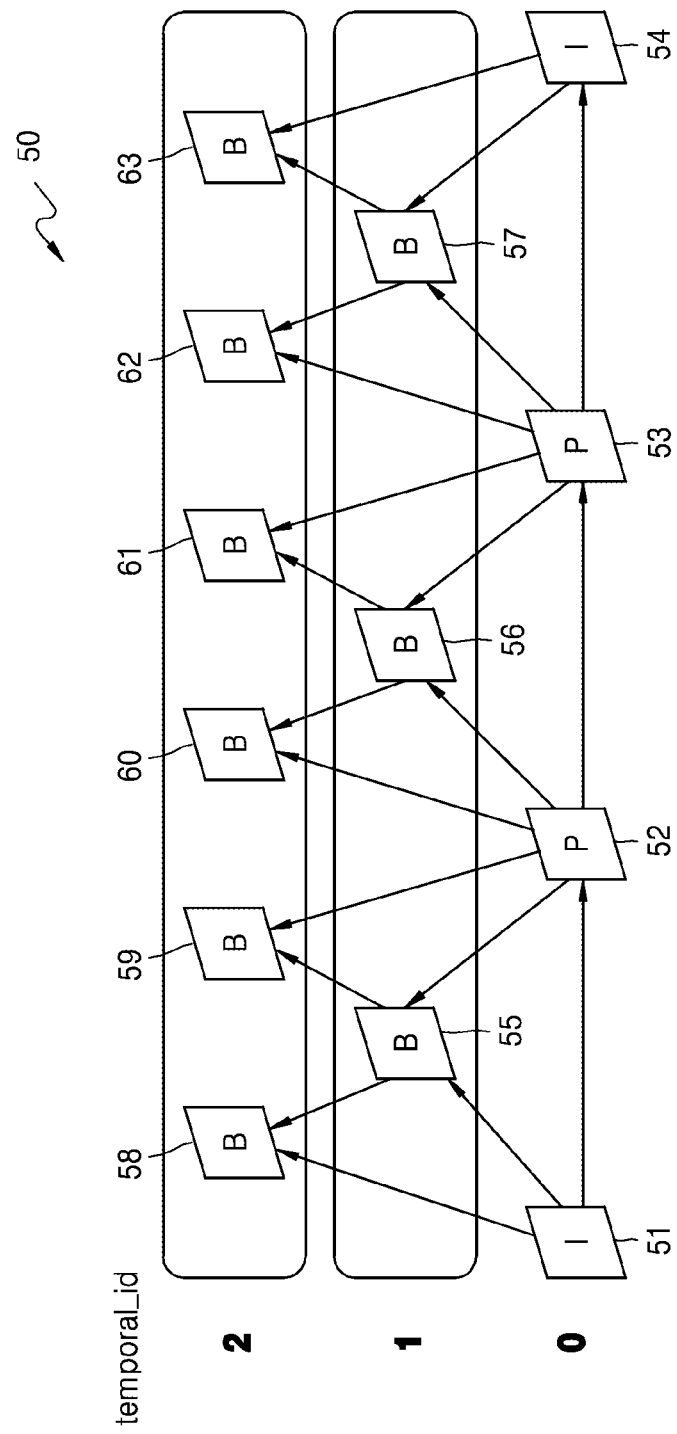
FIG. 4B illustrates a multilayer prediction structure according to temporal hierarchical encoding and decoding methods.

FIG. 4B illustrates a multilayer prediction structure according to temporal hierarchical encoding and decoding methods.

A scalable video coding method may be performed according to a temporal hierarchical prediction structure 40. According to the temporal hierarchical prediction structure 40, a prediction structure of hierarchical B-type images 55, 56, 57, 58, 59, 60, 61, 62, and 63 is included. In a level-0 prediction structure, inter prediction with respect to I-type images 51 and 54, and inter prediction with respect to P-type images 52 and 53 are performed. In a level-1 prediction structure, inter prediction is performed on B-type images 55, 56, and 57 by referencing I and P-type images 51, 52, 53, and 54. In a level-2 prediction structure, inter prediction is performed by referencing the I and P-type images 51, 52, 53, and 54 and the B-type images 55, 56, and 57 of the level-1.

temporal_id is a number to identify a prediction level, and as images of each level are output, a frame rate may be increased. For example, the images 51, 52, 53, and 54 of the level-0 are decoded and are output with a frame rate of 15 Hz. When the images 55, 56, and 57 of the level-1 are decoded and output, the frame rate may be increased to 30 Hz, and when the images 58, 59, 60, 61, 62, and 63 of the level-2 are decoded and output, the frame rate may be increased to 60 Hz.

According to the present embodiment, when the temporal hierarchical prediction structure 40 is embodied by using the scalable video coding method, level-0 images may be encoded as base layer images, level-1 images may be encoded as first enhancement layer images, and level-2 images may be encoded as second enhancement layer images.

In the decoding procedures of the multilayer prediction structures shown in FIGS. 4A and 4B, in order to reconstruct images via motion compensation or inter-layer decoding, previously-reconstructed base layer images may be used or previously-reconstructed enhancement layer images may be used. However, when layer switching occurs or a random access request occurs, an image whose reconstruction order precedes a current RAP image may not have been previously reconstructed. In this case, images that were predicted by referencing the image whose reconstruction order precedes the current RAP image cannot be reconstructed.

Hereinafter, with reference to FIGS. 5A through 7B, decoding operations that are performed according to types of a RAP image when a random access request occurs are described in detail.

Figure 5A:
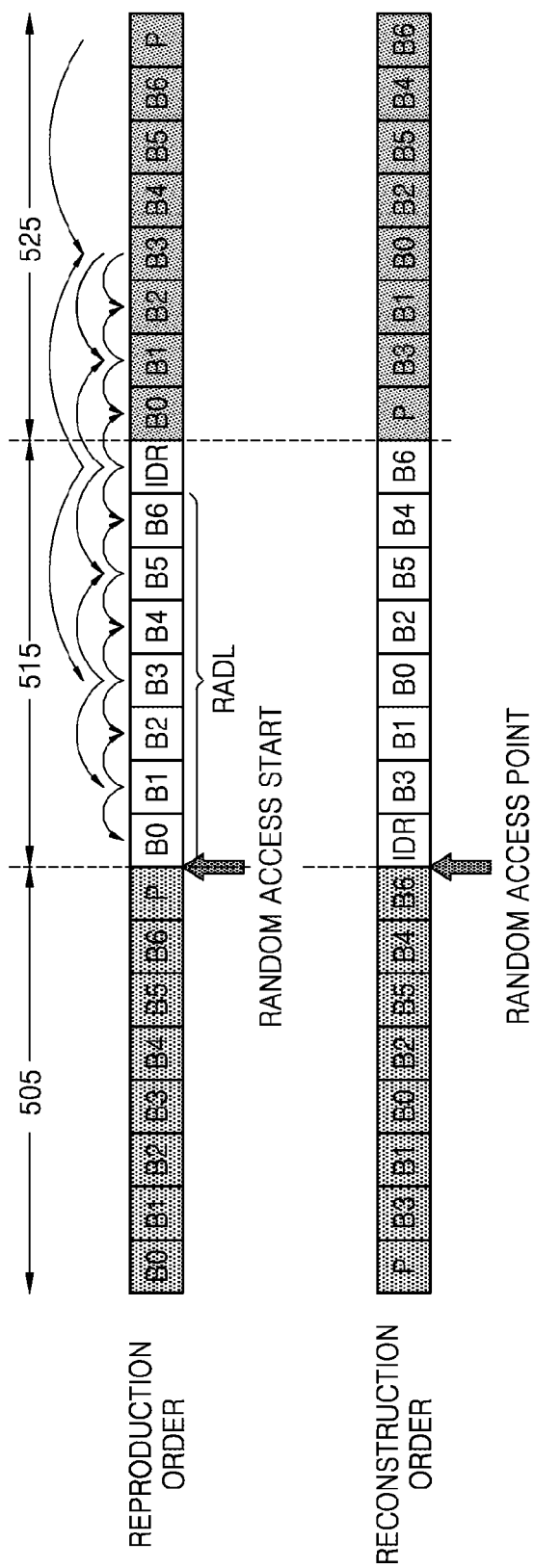
FIGS. 5A and 5B illustrate reproduction order and reconstruction order of an instantaneous decoding refresh (IDR) image, according to two embodiments.
Figure 5B:
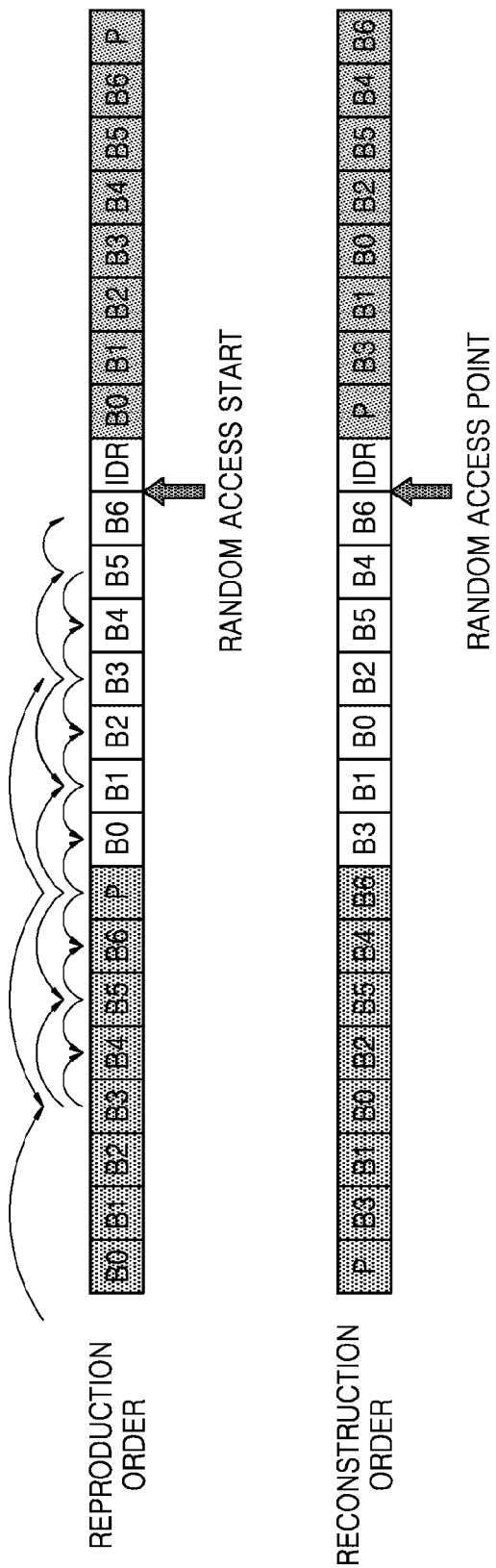

FIGS. 5A and 5B illustrate reproduction order and reconstruction order of an instantaneous decoding refresh (IDR) image, according to two embodiments.

In FIG. 5A, a size of each of group of pictures (GOP) 505, 515, and 525 is 8. B0, B1, B2, B3, B4, B5, and B6 are identification numbers of B-type images included in a same GOP, which are arranged according to reproduction order.

An IDR image is an image that is independently encoded. In a process of decoding the IDR image, all reconstructed images may be marked as "image not used as a reference image (unused for reference)". Images that follow the IDR image in reconstruction order may be reconstructed without performing inter prediction that uses images that precede the IDR image in reconstruction order. In a coded video sequence, a picture type of a first image in reconstruction order is the IDR picture.

For example, B-type images of the GOP 515 precede the IDR image in reproduction order but follow the IDR image in reconstruction order. Also, the B-type images of the GOP 515 do not reference other images that precede the IDR image in reproduction order. B-type images of the GOP 525 follow the IDR image in both reconstruction order and reproduction order, and do not reference other images that precede the IDR image in reproduction order.

It is assumed that random access occurs. Images that precede a random access point in reconstruction order cannot be reconstructed. In FIG. 5A, although the B-type images of the GOP 515 precede the IDR image in reproduction order, after IDR images are reconstructed, the B-type image of the GOP 515 may be reconstructed by referencing a reconstructed IDR image. In this case, the B-type images of the GOP 515 may be all decoded and output, thus, the B-type images of the GOP 515 may be RADL images. Therefore, since the B-type images of the P 515 may be all reproduced, the random access point and random access reproduction may match with each other.

In FIG. 5B, according to reproduction order from a random access point, B-type images of GOP 515 are not required to be decoded, thus, random access starts from an IDR image so that B-type images of a GOP 525 are reproduced.

If the IDR image is used, all images without a lost image may be smoothly reconstructed in reproduction order from the random access point, but a coding efficiency may deteriorate.

Figure 6B:
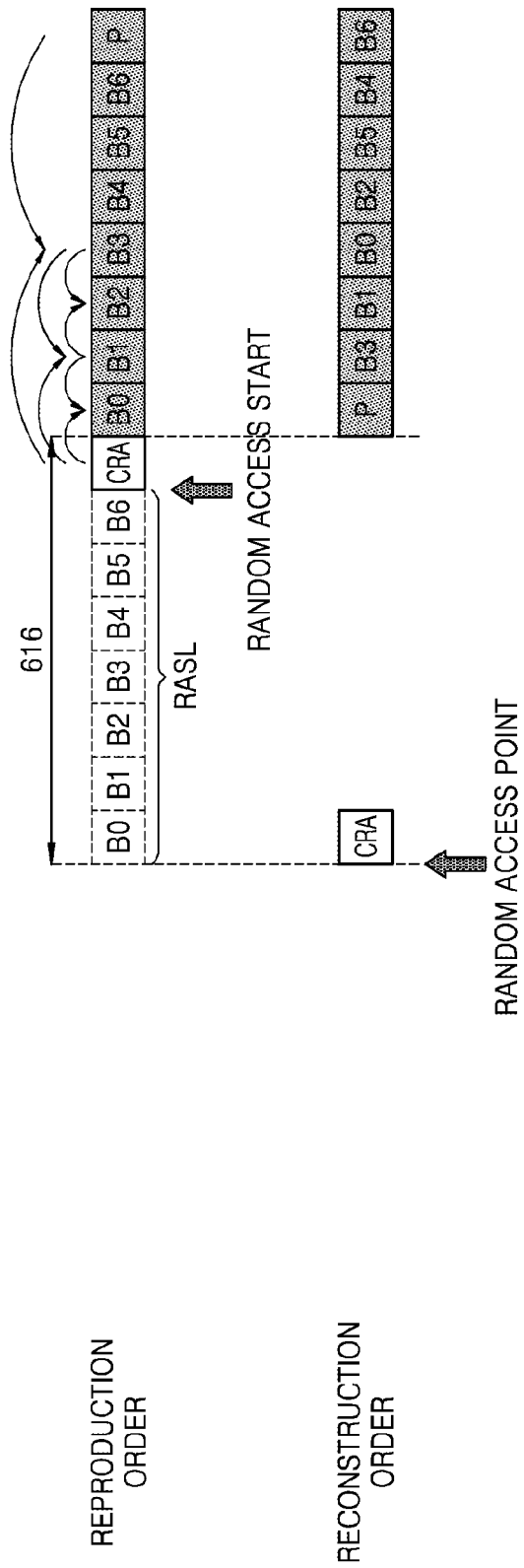

FIGS. 6A and 6B illustrate reproduction order and reconstruction order of a CRA image, according to two embodiments.

The CRA image includes only an I-type slice. In a process of decoding the CRA image, all reconstructed images stored in a decoded picture buffer (DPB) may be marked as "image not used as a reference image (unused for reference)". Images that follow the CRA image in both reconstruction order and reproduction order (i.e., in both decoding order and output order) may be reconstructed without performing inter prediction that uses images that precede the IDR image in either reconstruction order or reproduction order (i.e., in either decoding order or output order). An image that precedes the CRA image in reconstruction order also precedes the CRA image in reproduction order.

An image that follows the CRA image in both reconstruction order and reproduction order may be a normal image. Therefore, the normal image may use at least one image from among other normal images positioned in a same GOP as the CRA image.

The CRA picture may be a first image in reconstruction order in a coded video sequence. However, in a case of general reproduction where random access does not occur, the CRA picture may be positioned in the middle of a bitstream.

For example, in FIG. 6A, B-type images of a GOP 615 precede the CRA image in reproduction order but follow the CRA image in reconstruction order. B-type images of a GOP 625 are normal images that follow the CRA image in both reconstruction order and reproduction order, thus, the B-type images of the GOP 625 do not reference other images that precede an IDR image in reconstruction order. However, some images from among the B-type images of the GOP 615 may reference another image that precedes the CRA image in reconstruction order.

At a random access point of FIG. 6B, the B-type images of the GOP 615 reference an image that precedes the random access point, thus, the B-type images of the GOP 615 cannot be reconstructed. The B-type images of the GOP 615 are RASL images that are skipped during a reconstruction procedure. Therefore, random access reproduction may start from the CRA image, and then the B-type images of the GOP 625 may be immediately reconstructed and reproduced.

Figure 7A:
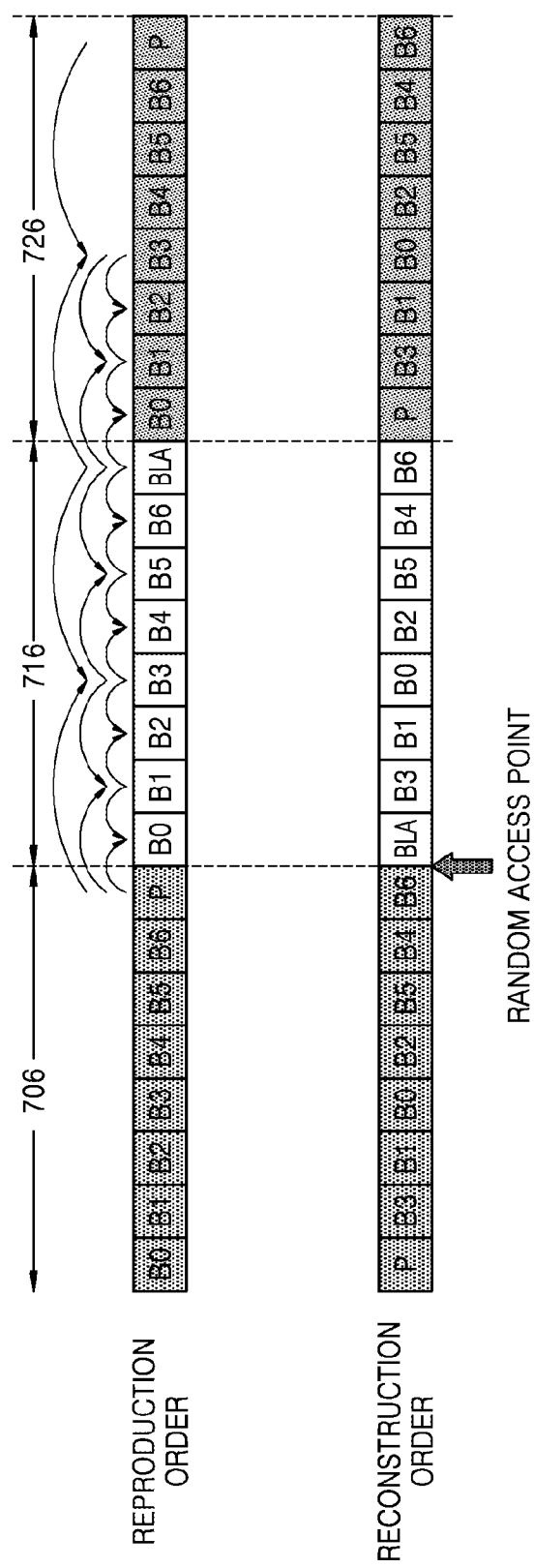

FIGS. 7A and 7B illustrate reproduction order and reconstruction order of a broken link access (BLA) image, according to two embodiments.

Bitstream slicing means an operation of connecting another bitstream to a position of a RAP image of a current bitstream. A point to which a new bitstream is connected is referred to as a broken link. A NAL unit type of the RAP image at the position where bitstream slicing is available is marked as a BLA image.

Referring to FIG. 7A, a BLA image is similar to a CRA image in reproduction order and reconstruction order. The BLA image follows B-type images of a GOP 716 that are leading images in reproduction order, and the BLA image precedes B-type images of a GOP 726 that are normal images. The leading images and the normal images follow the BLA image in reconstruction order.

Images B3, B4, B5, and B6 from among the leading images are RASL images that reference the BLA image and other images of the GOP 716. However, images B1, B2, and B2 from among the leading images are RADL images that reference images of a GOP 706 that precede the BLA image in reconstruction order.

Therefore, in FIG. 7B, when random access occurs in the BLA image, reconstruction with respect to RASL images B1, B2, and B2 may be skipped, and RADL images B3, B4, B5, and B6 may be reconstructed. Therefore, RADL images may be output from the RADL image B3 according to reproduction order.

In the hierarchical prediction structure described above with reference to FIG. 4B, temporal layer conversion or layer switching occurs, thus, a temporal sub-layer access (TSA) image may be used as a point for layer switching. The TSA image is similar to a CRA image. While lower layer images are reconstructed, layer switching that reconstructs upper layer images is available from the TSA image. For example, as 'temporal_id' is decreased, it is a lower layer. Images that follow the TLA image in reconstruction order in a same layer or images in an upper layer than the TLA image cannot reference images of the same layer or the upper layer of a previous TLA image that precedes the TLA image in reconstruction order. Since the TLA image cannot be a lowermost layer image, a 'temporal_id' value cannot be 0.

With reference to FIGS. 4b, 5a, 5b, 6a, 6b, 7a, and 7b, RAP types for random access have been described. In a case where a random access request or layer switching occurs while a videostream of a single layer is reconstructed, images may be reconstructed from a RAP image. However, when random access occurs in a predetermine layer from among multiple layers, and thus images of the predetermine layer are reconstructed, other layer images corresponding thereto are required to be correctly reconstructed. Also, when layer switching or random access is required in a predetermined layer, if a reference target image does not exist in a DPB and thus reconstruction with respect to a RASL image is skipped, reconstruction with respect to another layer image corresponding thereto may also be needed to be skipped.

Therefore, the multilayer video encoding apparatus 10 according to the present embodiment may dispose a RAP image with a same NAL unit type at a random access point or a layer switching point in each layer, and may dispose RASL or RADL images at same positions in each layer. Also, the multilayer video decoding apparatus 20 may reconstruct a RPA image with a same NAL unit type at a random access point or a layer switching point in each layer. Also, RSDL images at same positions may be reconstructed in each layer, and RASL images may also be reconstructed. When random access occurs in a predetermined layer, RPA images and RADL images at same positions may be reconstructed in each layer, reconstruction with respect to RASL images at same positions may be skipped.

For example, an enhancement layer IDR image at a position corresponding to a base layer IDR image may be reconstructed. An enhancement layer CRA image at a position corresponding to a base layer CRA image may be reconstructed. An enhancement layer BLA image at a position corresponding to a base layer BLA image may be reconstructed.

As another example, the multilayer video encoding apparatus 10 may dispose a CRA image, a RADL/RASL image, or a normal image of an enhancement layer which corresponds to a normal image of a base layer. The multilayer video decoding apparatus 20 according to the present embodiment may reconstruct a CRA image, a RADL/RASL image, or a normal image of an enhancement layer which corresponds to a normal image of a base layer.

Also, a temporal layer number 'temporal_id' of base layer images has to be greater than a temporal layer number of enhancement layer images.

According to the multilayer video encoding apparatus 10 and the multilayer video decoding apparatus 20 according to the embodiments, even if random access or layer switching occurs in a multilayer prediction structure, images at same positions of each layer may be reconstructed or ignored. Accordingly, a reference image for inter-layer prediction may be obtained, and output images of each layer may be correctly aligned.

The multilayer video encoding apparatus 10 of FIG. 1A may generate samples by performing intra prediction, inter prediction, inter-layer prediction, transformation, and quantization on each of image blocks, may perform entropy-encoding on the samples, and thus may output a bitstream. In order to output a video encoding result, i.e., a base layer imagestream and an enhancement layer imagestream, from the multilayer video encoding apparatus 10, the multilayer video encoding apparatus 10 may interoperate with an internal video encoding processor that is internally embedded or an external video encoding processor, and thus may perform a video encoding operation including transformation and quantization. The internal video encoding processor of the multilayer video encoding apparatus 10 may be a separate processor, or a video encoding apparatus or a central processing unit (CPU), a graphical operational unit includes a video encoding processing module and thus performs a basic video encoding operation.

Also, the multilayer video decoding apparatus 20 of FIG. 2A performs decoding on each of a received base layer imagestream and a received enhancement layer imagestream. That is, inverse-quantization, inverse-transformation, intra prediction, and motion compensation (motion compensation between images, inter-layer disparity compensation) may be performed on each of image blocks of the base layer imagestream and the enhancement layer imagestream, so that samples of base layer images may be reconstructed from the base layer imagestream, and samples of enhancement layer images may be reconstructed from the enhancement layer imagestream. In order to output a reconstructed image generated according to a decoding result, the multilayer video decoding apparatus 20 according to the embodiment may interoperate with an internally-embedded video decoding processor or an external video decoding processor, and thus may perform a video reconstructing operation including inverse-quantization, inverse-transformation, prediction/compensation. The internal video decoding processor of the multilayer video decoding apparatus 20 may be a separate processor, or a video decoding apparatus or a CPU, a graphical operational unit includes a video decoding processing module and thus performs a basic video reconstructing operation.

The multilayer video encoding apparatus 10 and the multilayer video decoding apparatus 20 according to the embodiments split blocks of divided video data into coding units of a tree structure, and encoding units, prediction units, and transformation units are used for inter-layer prediction or inter-prediction of the coding unit. Hereinafter, with reference to FIGS. 8 through 20, a video encoding method and apparatus therefor, and a video decoding method and apparatus therefor, based on coding units and transformation units of a tree structure, are described.

Basically, in an encoding/decoding procedure for a multilayer video, an encoding/decoding procedure for base layer images, and an encoding/decoding procedure for enhancement layer images are separately performed. That is, when inter-layer prediction occurs in the multilayer video, encoding/decoding results of a single layer video may be mutually referred to, but an encoding/decoding procedure is performed for each of single layer videos.

Therefore, for convenience of description, a video encoding procedure and a video decoding procedure based on coding units of a tree structure that are described later with reference to FIGS. 8 through 20 are a video encoding procedure and a video decoding procedure for a single layer video, thus, inter-prediction and motion compensation are described in detail. However, as described above with reference to FIGS. 1A through 7B, for multilayer video encoding/decoding, inter-layer prediction and compensation between base layer images and enhancement layer images are performed.

Figure 8:
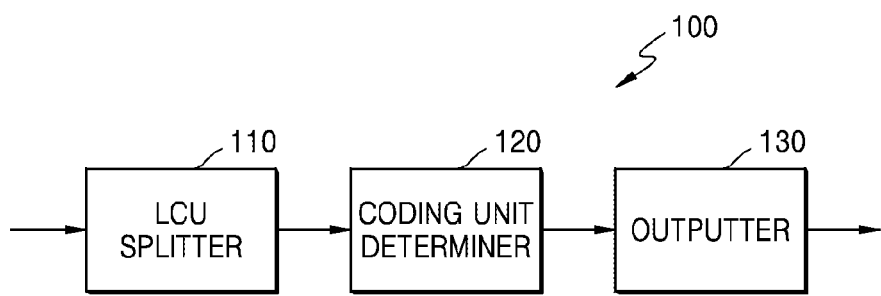
FIG. 8 illustrates a block diagram of a video encoding apparatus based on coding units of a tree structure, according to an embodiment.

Therefore, in order for the encoder 12 of the multilayer video encoding apparatus 10 according to the embodiment to encode a multilayer video, based on coding units of a tree structure, the encoder 12 may include video encoding apparatuses 100 of FIG. 8 corresponding to the number of layers of a multilayer video so as to perform video encoding on each of single layer videos, and may control the video encoding apparatuses 100 to encode the single layer videos, respectively. Also, the multilayer video encoding apparatus 10 may perform inter-view prediction by using encoding results with respect to discrete single views obtained by the video encoding apparatuses 100. Accordingly, the encoder 12 of the multilayer video encoding apparatus 10 may generate a base layer imagestream and an enhancement layer imagestream that include an encoding result of each layer.

Figure 9:
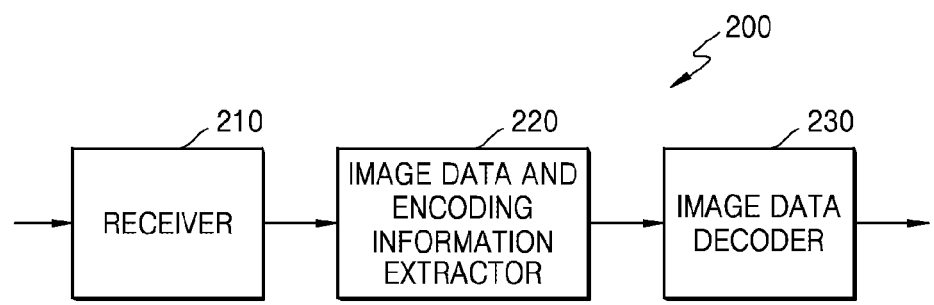
FIG. 9 illustrates a block diagram of a video decoding apparatus based on coding units of a tree structure, according to an embodiment.

Similarly, in order for the multilayer video decoding apparatus 20 according to the present embodiment to decode a multilayer video, based on coding units of a tree structure, the multilayer video decoding apparatus 20 may include video decoding apparatuses 200 of FIG. 9 corresponding to the number of layers of a multilayer video so as to perform video decoding on each of layers of a received base layer videostream and a received enhancement layer videostream, and may control the video decoding apparatuses 200 to decode single layer videos, respectively. Then, the multilayer video decoding apparatus 20 may perform inter-layer compensation by using decoding results with respect to discrete single layers obtained by the video decoding apparatuses 200. Accordingly, the multilayer video decoding apparatus 20 may generate base layer images and enhancement layer images that are reconstructed for each of the layers.

FIG. 8 illustrates a block diagram of a video encoding apparatus based on coding units of a tree structure 100, according to an embodiment.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred as 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a coded depth by encoding the image data in the deeper coding units according to depths, according to the largest coding unit of the current picture, and selecting a depth having the least encoding error. The determined coded depth and the encoded image data according to the determined coded depth are output to the output unit 130.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be determined for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the coded depths may differ according to regions in the image data. Thus, one or more coded depths may be set in one largest coding unit, and the image data of the largest coding unit may be divided according to coding units of at least one coded depth.

Accordingly, the coding unit determiner 120 may determine coding units having a tree structure included in the largest coding unit. The 'coding units having a tree structure' according to an embodiment include coding units corresponding to a depth determined to be the coded depth, from among all deeper coding units included in the largest coding unit. A coding unit of a coded depth may be hierarchically determined according to depths in the same region of the largest coding unit, and may be independently determined in different regions. Similarly, a coded depth in a current region may be independently determined from a coded depth in another region.

A maximum depth according to an embodiment is an index related to the number of splitting times from a largest coding unit to a minimum coding unit. A first maximum depth according to an embodiment may denote the total number of splitting times from the largest coding unit to the minimum coding unit. A second maximum depth according to an embodiment may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the minimum coding unit is a coding unit in which the largest coding unit is split four times, 5 depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 100 according to the present embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and information about at least one encoding mode is determined for a coding unit of a coded depth, information about at least one encoding mode may be determined for one largest coding unit. Also, a coded depth of the image data of the largest coding unit may be different according to locations since the image data is hierarchically split according to depths, and thus information about the coded depth and the encoding mode may be set for the image data.

Accordingly, the output unit 130 according to the present embodiment may assign encoding information about a corresponding coded depth and an encoding mode to at least one of the coding unit, the prediction unit, and a minimum unit included in the largest coding unit.

The minimum unit according to an embodiment is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information that are related to prediction.

According to the simplest embodiment for the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to the present embodiment, image compression efficiency may be increased since a coding unit is adjusted while considering characteristics of an image while increasing a maximum size of a coding unit while considering a size of the image.

The multilayer video encoding apparatus 10 described above with reference to FIG. 1A may include the video encoding apparatuses 100 corresponding to the number of layers so as to encode single layer images in each of the layers of a multilayer video. For example, a base layer encoder 12 may include one video encoding apparatus 100, and an enhancement layer encoder 14 may include the video encoding apparatuses 100 corresponding to the number of enhancement layers.

When the video encoding apparatuses 100 encode base layer images, the coding unit determiner 120 may determine a prediction unit for inter-image prediction for each of coding units of a tree structure according to each largest coding unit, and may perform the inter-image prediction on each prediction unit.

When the video encoding apparatuses 100 encode enhancement layer images, the coding unit determiner 120 may determine prediction units and coding units of a tree structure according to each largest coding unit, and may perform inter-prediction on each of the prediction units.

When the coding unit determiner 120 encodes the base layer images, randomly-accessible RPA images are designated, and intra prediction may be performed on the base layer RPA images. When random access or layer switching occurs, a RPA image may be reconstructed without a previous reconstructed image.

When the coding unit determiner 120 encodes an enhancement layer stream, the coding unit determiner 120 may encode a RPA image having a same RPA type as a base layer RAP image, at a position corresponding to a RPA image of a base layer stream. The coding unit determiner 120 may perform intra prediction on enhancement layer RPA images.

The coding unit determiner 120 may perform inter prediction on a non-RPA image by referencing at least one of a RPA image and another non-RPA image. Enhancement layer images at positions corresponding to a base layer RASL image are RASL images, and may reference a following RPA image and a preceding RPA image. Enhancement layer images at positions corresponding to a RADL image of a base layer stream are RADL images, and may reference only a following RPA image. An enhancement layer image corresponding to a base layer normal image may be encoded as a CRA image, a RADL/RASL image, or a normal image.

FIG. 9 illustrates a block diagram of a video decoding apparatus based on coding units of a tree structure 200, according to an embodiment of the present invention.

The video decoding apparatus involving video prediction based on coding units of the tree structure 200 according to the present embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred as 'video decoding apparatus 200'.

Definitions of various terms, such as a coding unit, a depth, a prediction unit, a transformation unit, and information about various encoding modes, for decoding operations of the video decoding apparatus 200 according to the present embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each largest coding unit, from the parsed bitstream. The extracted information about the coded depth and the encoding mode is output to the image data decoder 230. That is, the image data in a bit stream is split into the largest coding unit so that the image data decoder 230 decodes the image data for each largest coding unit.

The information about the coded depth and the encoding mode according to the largest coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each largest coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding largest coding unit is recorded according to predetermined data units, the predetermined data units to which the same information about the coded depth and the encoding mode is assigned may be inferred to be the data units included in the same largest coding unit.

The image data decoder 230 reconstructs the current picture by decoding the image data in each largest coding unit based on the information about the coded depth and the encoding mode according to the largest coding units. In other words, the image data decoder 230 may decode the encoded image data based on the extracted information about the partition type, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial domain of the coding unit may be reconstructed.

The image data decoder 230 may determine a coded depth of a current largest coding unit by using split information according to depths. If the split information indicates that image data is no longer split in the current depth, the current depth is a coded depth. Accordingly, the image data decoder 230 may decode encoded data in the current largest coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The multilayer video encoding apparatus 10 described above with reference to FIG. 1A may include the image data decoders 230 of the video decoding apparatuses 200 corresponding to the number of layers so as to generate a reference image for inter prediction in each of layers of a multilayer video. For example, the base layer encoder 12 may include one image data decoder 230, and the enhancement layer encoder 14 may include the video decoding apparatuses 200 corresponding to the number of enhancement layers.

Also, the multilayer video decoding apparatus 20 described above with reference to FIGS. 2A and 3A may include the video decoding apparatuses 200 corresponding to the number of views, so as to decode a received base layer image stream and a received enhancement layer image stream and to reconstruct base layer images and enhancement layer images. For example, a base layer decoder 22 may include one video decoding apparatus 200, and an enhancement layer decoder 24 may include the video decoding apparatuses 200 corresponding to the number of enhancement layers.

When the base layer image stream is received, the image data decoder 230 of the video decoding apparatus 200 may split samples of the base layer images, which are extracted from the base layer image stream by an extractor 220, into coding units according to a tree structure of a largest coding unit. The image data decoder 230 may perform motion compensation, based on prediction units for the inter-image prediction, on each of the coding units according to the tree structure of the samples of the base layer images, and may reconstruct the base layer images.

When the enhancement layer image stream is received, the image data decoder 230 of the video decoding apparatus 200 may split samples of the enhancement layer images, which are extracted from the enhancement layer image stream by the extractor 220, into coding units according to a tree structure of a largest coding unit. The image data decoder 230 may perform motion compensation, based on prediction units for the inter-image prediction, on each of the coding units of the samples of the enhancement layer images, and may reconstruct the enhancement layer images.

When the image data decoder 230 decodes a base layer stream, the image data decoder 230 may reconstruct RPA images, based on a NAL unit type. When random access or layer switching occurs, an RPA image may be reconstructed without a previous reconstructed image.

When the image data decoder 230 decodes an enhancement layer stream, the image data decoder 230 may decode a RPA image having a same RPA type as a base layer RAP image, at a position corresponding to a RPA image of a base layer stream. The image data decoder 230 may perform intra prediction on enhancement layer RPA images.

The image data decoder 230 may perform motion compensation on a non-RPA image by referencing at least one of a RPA image and another non-RPA image. Enhancement layer images at positions corresponding to a base layer RASL image are RASL images, and may reference a following RPA image and a preceding RPA image. Enhancement layer images at positions corresponding to a RADL image of a base layer stream are RADL images, and may reference only a following RPA image. An enhancement layer image corresponding to a base layer normal image may be reconstructed as a CRA image, a RADL/RASL image, or a normal image.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using information about an optimum encoding mode received from an encoder.

Figure 10:
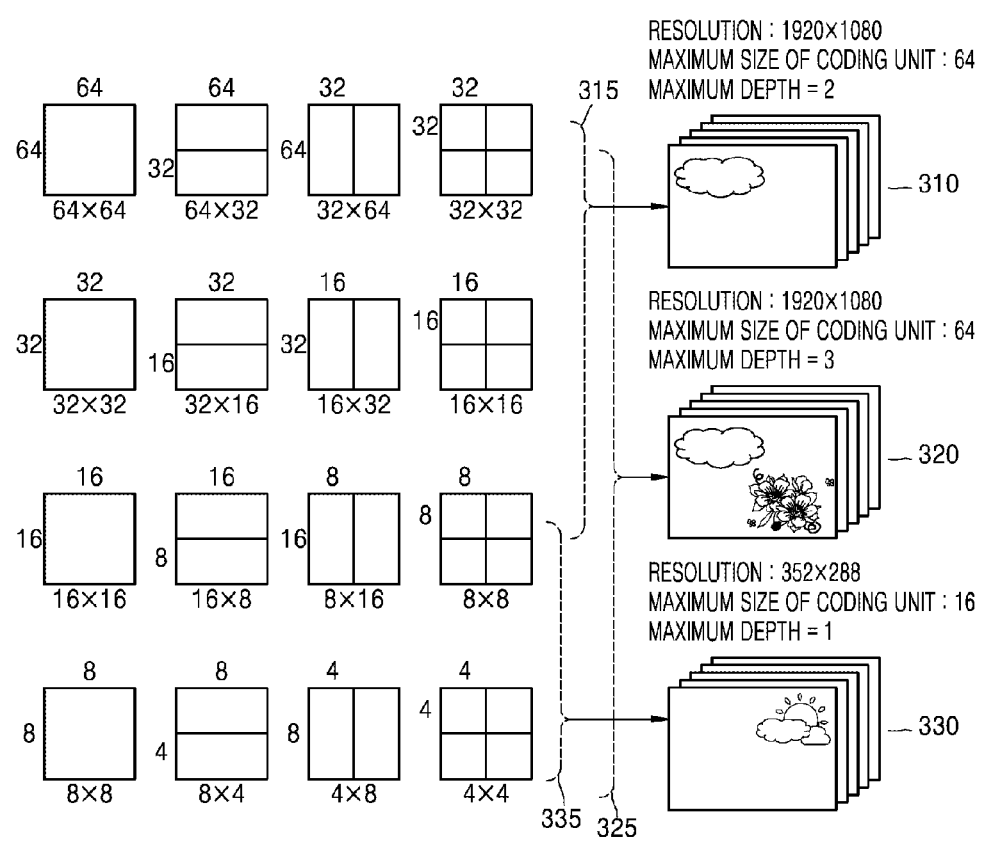
FIG. 10 illustrates a diagram for describing a concept of coding units according to an embodiment of the present invention.

FIG. 10 illustrates a diagram for describing a concept of coding units according to an embodiment of the present invention.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes the total number of splits from a largest coding unit to a minimum decoder.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
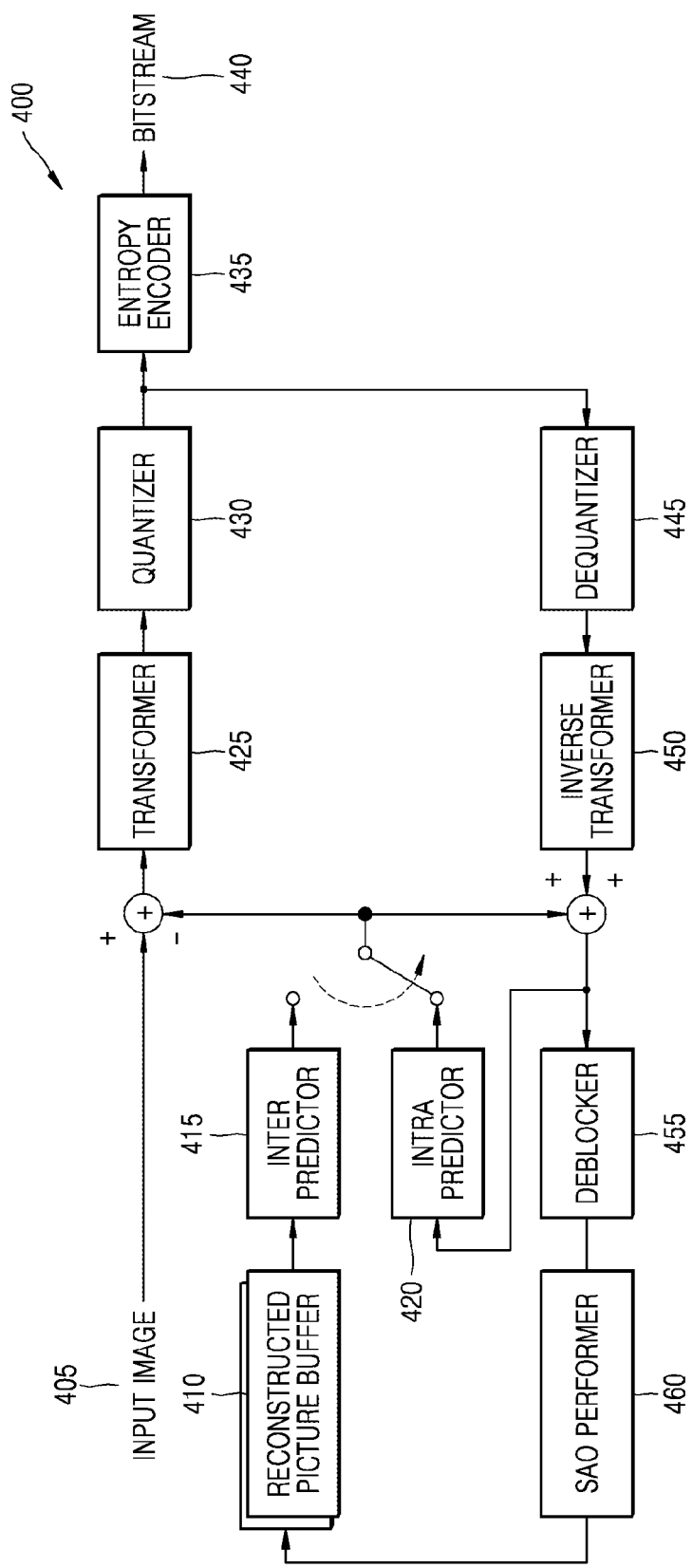
FIG. 11 illustrates a block diagram of an image encoder based on coding units, according to an embodiment of the present invention.

FIG. 11 illustrates a block diagram of an image encoder 400 based on coding units, according to an embodiment.

The image encoder 400 according to the embodiment performs operations of the video encoding apparatus 100 to encode image data. That is, an intra predictor 420 performs intra prediction on a coding unit in an intra mode and from among a current image 405, according to prediction units, and an inter predictor 415 performs inter prediction on a coding unit in an inter mode according to prediction units, by using a reference image obtained from the current image 405 and a reconstructed picture buffer 410. The current image 405 may be split by a largest coding unit and may be sequentially encoded. Here, encoding may be performed on coding units of a tree structure, which are split from the largest coding unit.

Prediction data with respect to the coding unit in each mode output from the intra predictor 420 or the inter predictor 415 is subtracted from data with respect to an encoded coding unit of the current image 405, so that residue data is generated. The residue data is output as a quantized transformation coefficient of each transformation unit through a transformer 425 and a quantizer 430. The quantized transformation coefficient is reconstructed as residue data of a spatial domain through an inverse quantizer 445 and an inverse transformer 450. The reconstructed residue data of the spatial domain is added to the prediction data with respect to the coding unit in each mode output from the intra predictor 420 or the inter predictor 415, and thus is reconstructed as data of the spatial domain with respect to the coding unit of the current image 405. The reconstructed data of the spatial domain is generated as a reconstructed image through a deblocking unit 455 and an SAO performer 460. The generated reconstructed image is stored in the reconstructed picture buffer 410. Reconstructed images stored in the reconstructed picture buffer 410 may be used as a reference image for inter prediction with respect to another image. The transformation coefficient quantized in the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 may perform operations based on each coding unit among coding units according to a tree structure in each largest coding unit.

In particular, the intra predictor 420 and the inter predictor 415 may determine a partition mode and a prediction mode of each coding unit from among the coding units according to a tree structure by referring to a maximum size and a maximum depth of a current largest coding unit, and the transformer 425 may determine whether or not to split a transformation unit according to a quadtree in each coding unit from among the coding units according to the tree structure.

Figure 12:
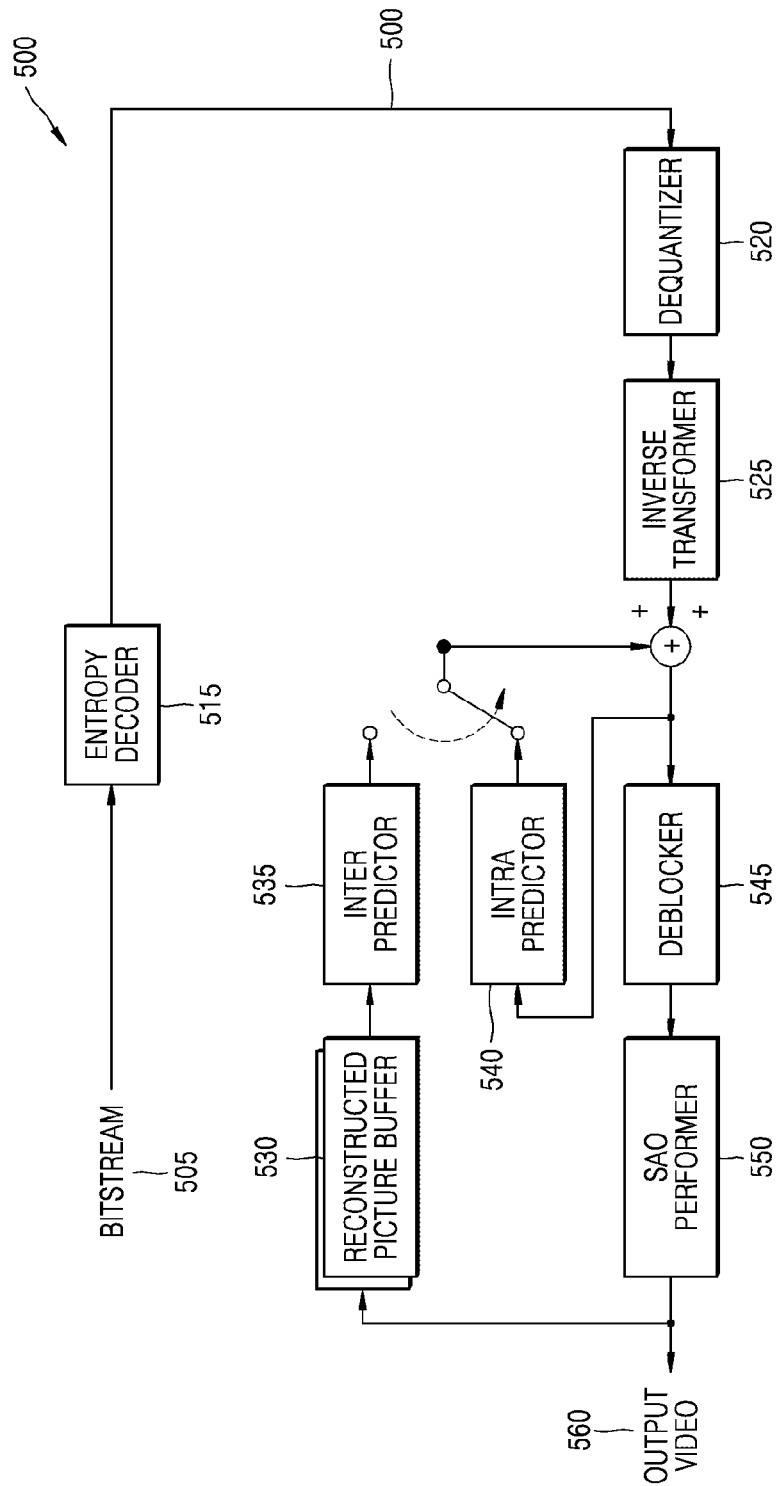
FIG. 12 illustrates a block diagram of an image decoder based on coding units, according to an embodiment of the present invention.

FIG. 12 illustrates a block diagram of an image decoder 500 based on coding units, according to an embodiment.

An entropy decoder 515 parses, from a bitstream 505, encoded image data to be decoded and encoding information required for decoding. The encoded image data is as a quantized transformation unit, and an inverse quantizer 520 and an inverse transformer 525 reconstruct residue data from the quantized transformation unit.

An intra predictor 540 performs intra prediction on a coding unit in an intra mode according to prediction units. An inter predictor 535 performs inter prediction by using a reference image with respect to a coding unit in an inter mode from among a current image, which is obtained by a reconstructed picture buffer 530 according to prediction units.

Prediction data with respect to the coding unit in each mode which passed through the intra predictor 540 or the inter predictor 535, and the residue data are added, so that data of a spatial domain with respect to the coding unit of the current image 405 may be reconstructed, and the reconstructed data of the spatial domain may be output as a output video through a deblocking unit 545 and an SAO performer 550.

In order for the image data decoder 230 of the video decoding apparatus 200 to decode the image data, operations after the entropy decoder 515 of the image decoder 500 may be sequentially performed.

In order for the image decoder 500 to be applied in the video decoding apparatus 200, all elements of the image decoder 500, i.e., the entropy decoder 515, the inverse quantizer 520, the inverse transformer 525, the intra predictor 540, the inter predictor 535, the deblocking unit 545, and the SAO performer 550 may perform operations based on each coding unit from among coding units according to a tree structure for each largest coding unit.

In particular, the intra predictor 540 and the inter predictor 535 may determine a partition mode and a prediction mode of each coding unit from among the coding units according to a tree structure, and the inverse transformer 525 may determine whether or not to split a transformation unit according to a quadtree in each coding unit.

The encoding operation of FIG. 11 and the decoding operation of FIG. 12 are described as a videostream encoding operation and a videostream decoding operation, respectively, in a single layer. Therefore, if the encoder 12 of FIG. 1A encodes a videostream of at least two layers, the encoder 12 may include the image encoder 400 for each of layers. Similarly, if the decoder 24 of FIG. 2A decodes a videostream of at least two layers, the decoder 24 may include the image decoder 500 for each of layers.

Figure 13:
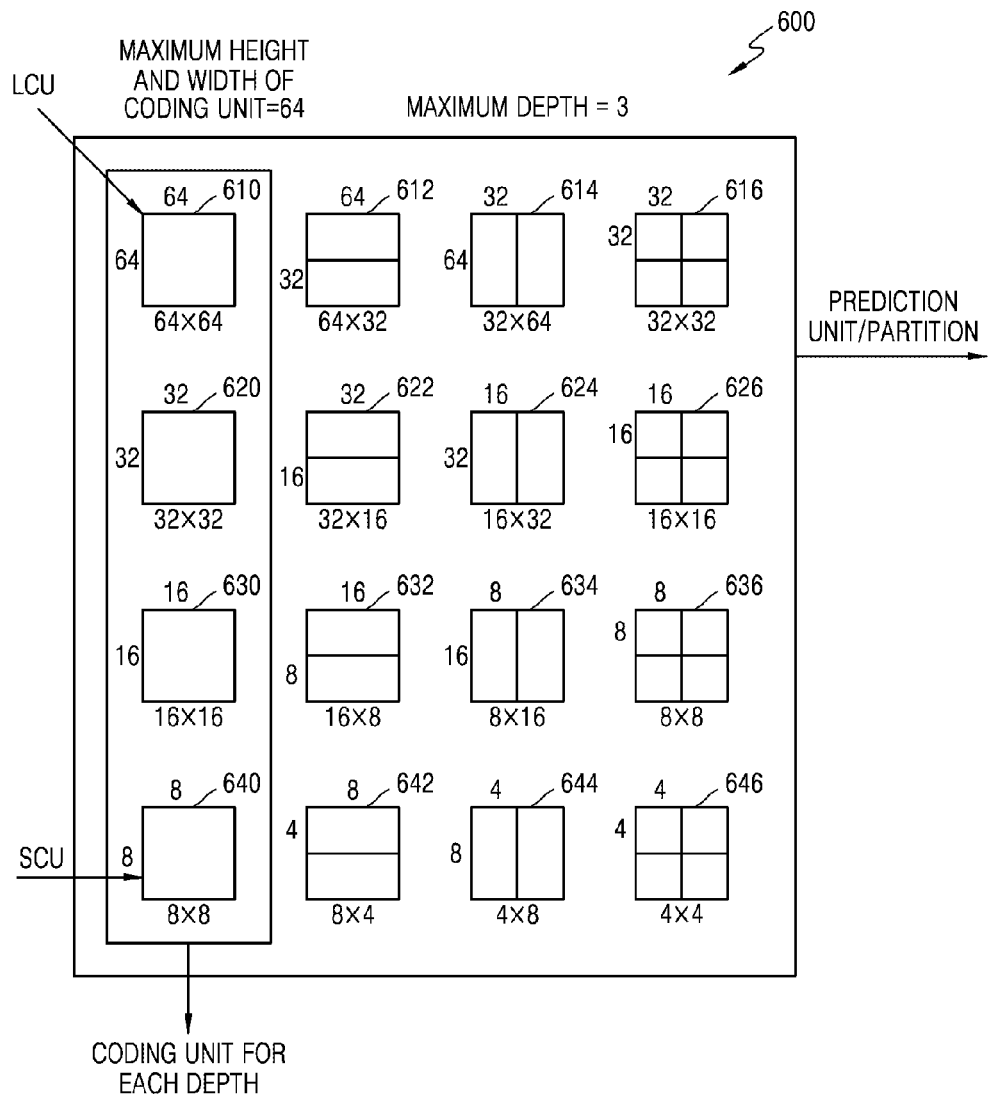
FIG. 13 illustrates a diagram illustrating deeper coding units according to depths, and partitions, according to an embodiment of the present invention.

FIG. 13 illustrates a diagram illustrating deeper coding units according to depths, and partitions, according to an embodiment of the present invention.

The video encoding apparatus 100 according to the present embodiment and the video decoding apparatus 200 according to the present embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to the present embodiment, the maximum height and the maximum width of the coding units are each 64, and the maximum depth is 3. In this case, the maximum depth refers to a total number of times the coding unit is split from the largest coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoder 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the largest coding unit 610, the coding unit determiner 120 of the video encoding apparatus 100 performs encoding for coding units corresponding to each depth included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 600. Alternatively, the minimum encoding error may be searched for by comparing representative encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
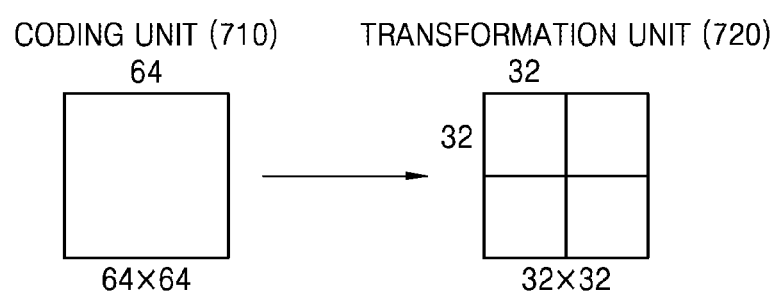
FIG. 14 illustrates a diagram for describing a relationship between a coding unit and transformation units, according to an embodiment of the present invention.

FIG. 14 illustrates a diagram for describing a relationship between a coding unit 710 and transformation units 720, according to an embodiment of the present invention.

The video encoding apparatus 100 according to the present embodiment or the video decoding apparatus 200 according to the present embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
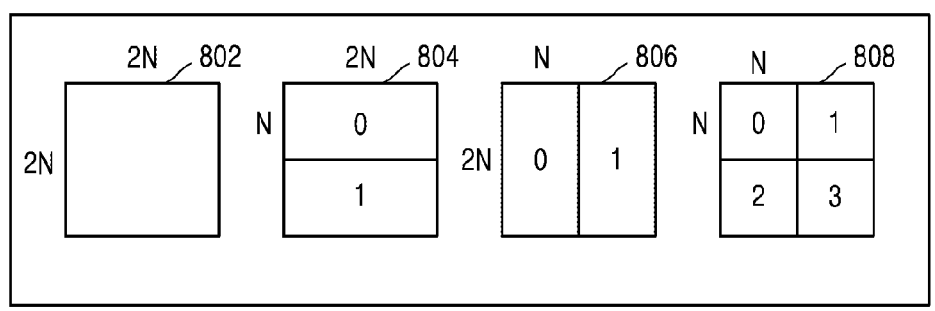
FIG. 15 illustrates a plurality of pieces of encoding information according to depths, according to an embodiment of the present invention.
Figure 15:
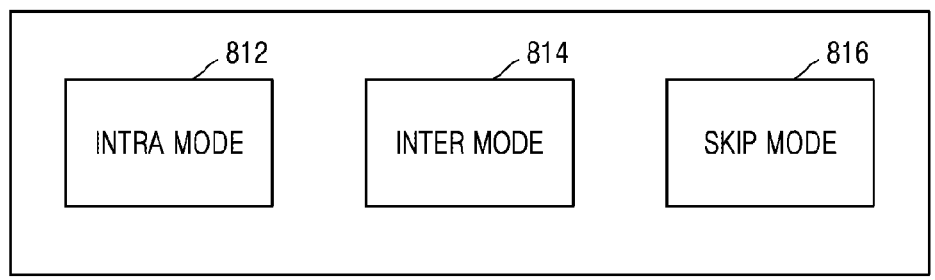
Figure 15:
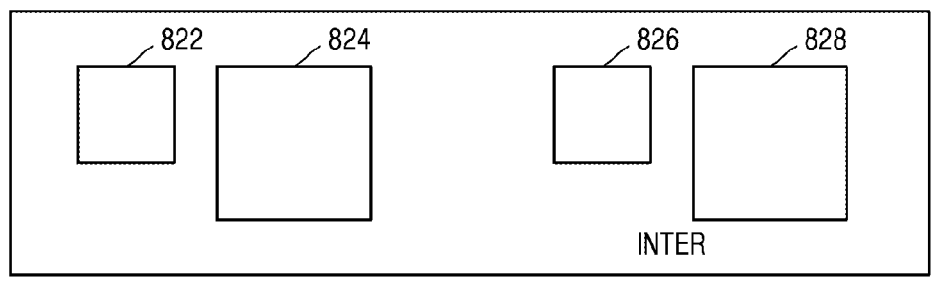

FIG. 15 illustrates a plurality of pieces of encoding information according to depths, according to an embodiment of the present invention.

The output unit 130 of the video encoding apparatus 100 may encode and transmit partition type information 800, prediction mode information 810, and transformation unit size information 820 for each coding unit corresponding to a coded depth, as information about an encoding mode.

The partition type information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the partition type information 800 is set to indicate one of the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition type information 800, i.e., an intra mode 812, an inter mode 814, or a skip mode 816.

The transformation unit size information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the partition type information 800, the prediction mode information 810, and the transformation unit size information 820 for decoding, according to each deeper coding unit.

Figure 16:
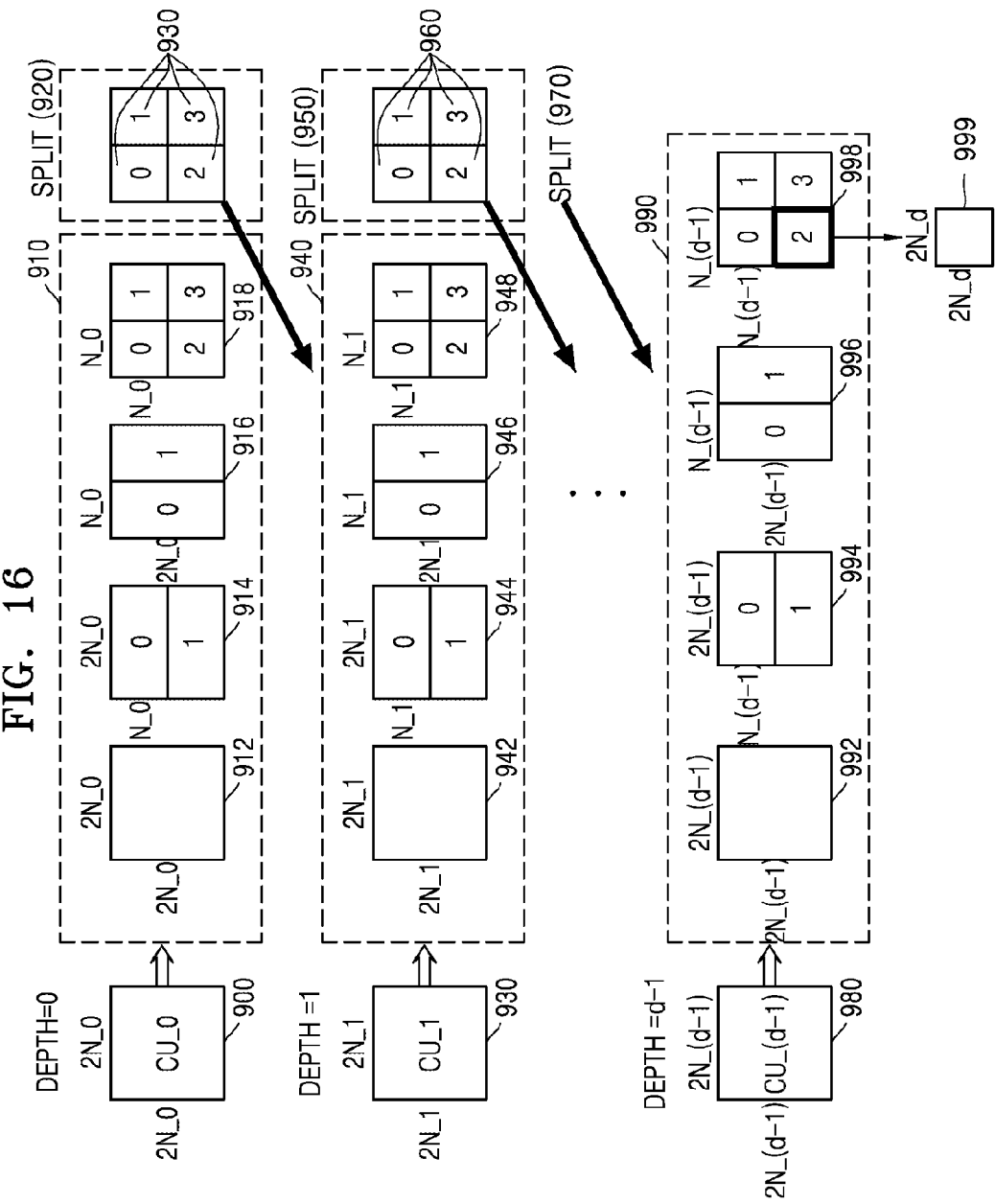
FIG. 16 is a diagram of deeper coding units according to depths, according to an embodiment of the present invention.

FIG. 16 is a diagram of deeper coding units according to depths, according to an embodiment of the present invention.

Split information may be used to indicate a change of a depth. The spilt information indicates whether a coding unit of a current depth is split into coding units of a lower depth.

Figure 23:
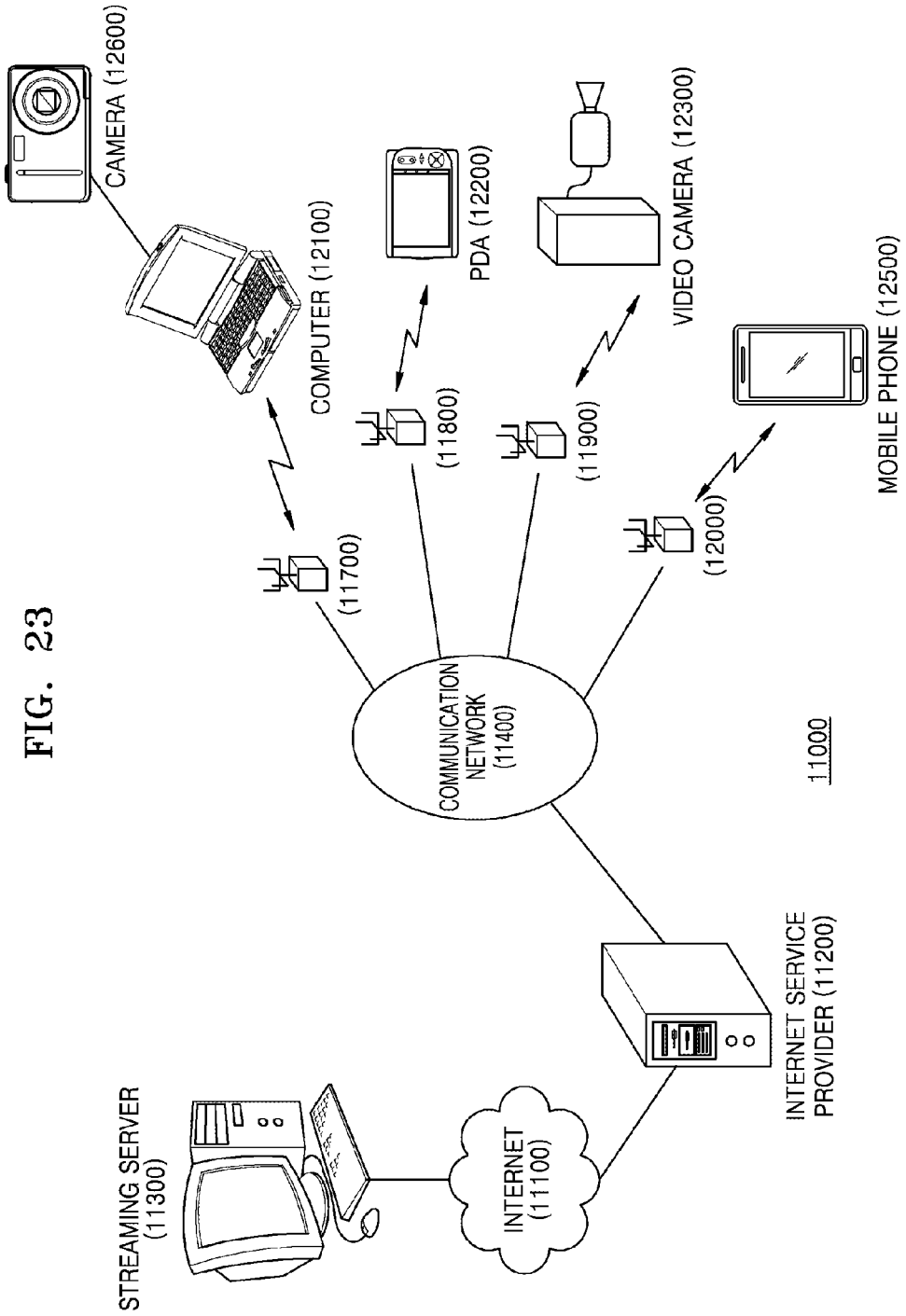
FIG. 23 illustrates a diagram of an overall structure of a content supply system for providing a content distribution service.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 23 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912, 914, and 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current largest coding unit 900 is determined to be d−1 and a partition type of the current largest coding unit 900 may be determined to be N_(d−1)×N_(d−1). Also, since the maximum depth is d, split information for the coding unit 952 having a depth of d−1 is not set.

A data unit 999 may be a 'minimum unit' for the current largest coding unit. A minimum unit according to the embodiment may be a square data unit obtained by splitting a minimum coding unit 980 having a lowermost coded depth by 4. By performing the encoding repeatedly, the video encoding apparatus 100 according to the embodiment may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0, 1, . . . , d−1, d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to '0', and split information of depths excluding the coded depth is set to '1'.

The image data and encoding information extractor 220 of the video decoding apparatus 200 according to the embodiment may extract and use the information about the coded depth and the prediction unit of the coding unit 900 to decode the partition 912. The video decoding apparatus 200 according to the embodiment may determine a depth, in which split information is '0', as a coded depth by using split information according to depths, and use information about an encoding mode of the corresponding depth for decoding.

Figure 17:
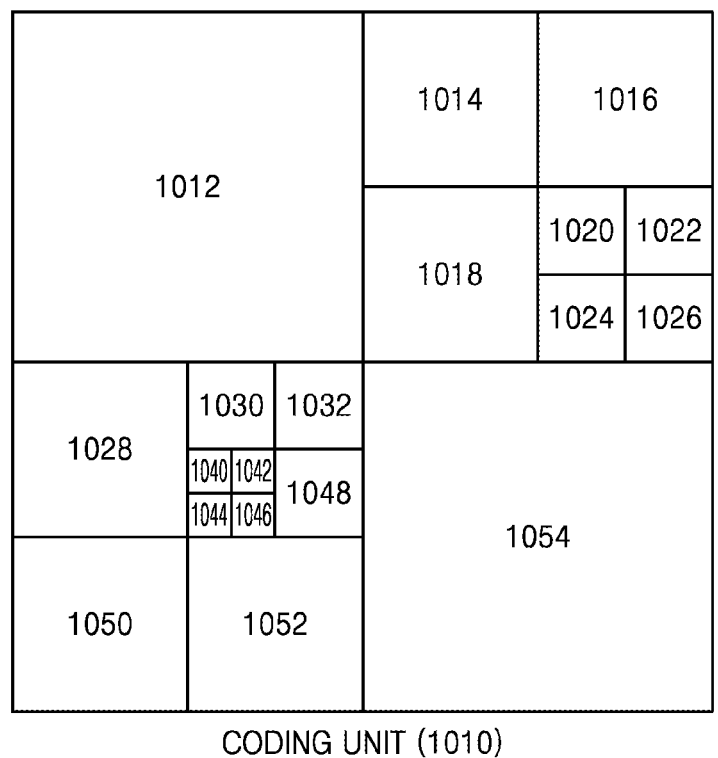
FIGS. 17, 18, and 19 are diagrams for describing a relationship between coding units, prediction units, and transformation units, according to embodiments of the present invention.
Figure 18:
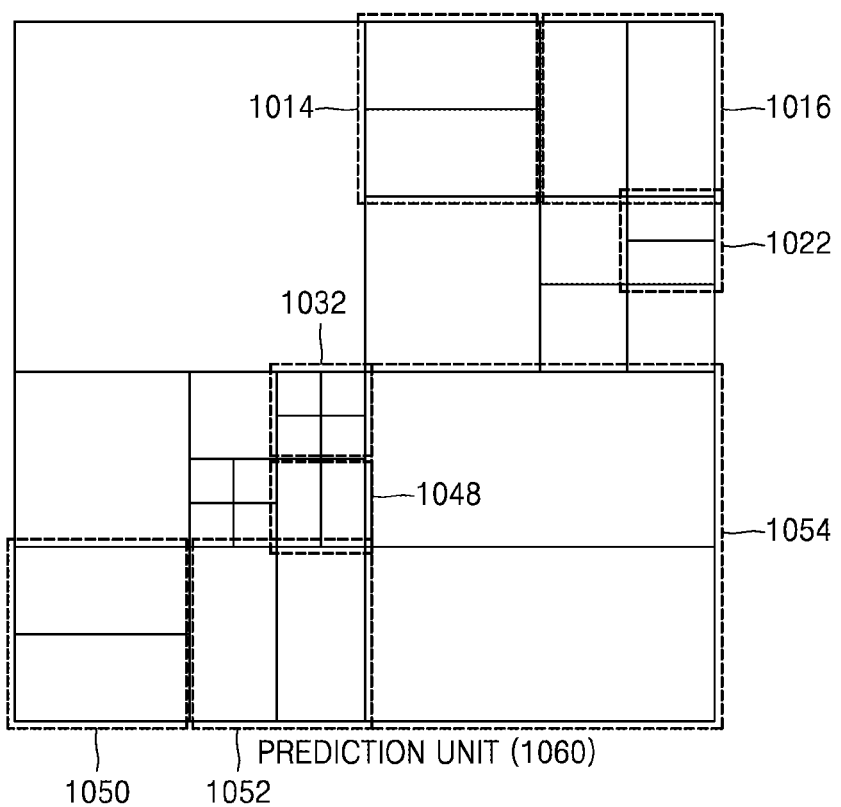
Figure 19:
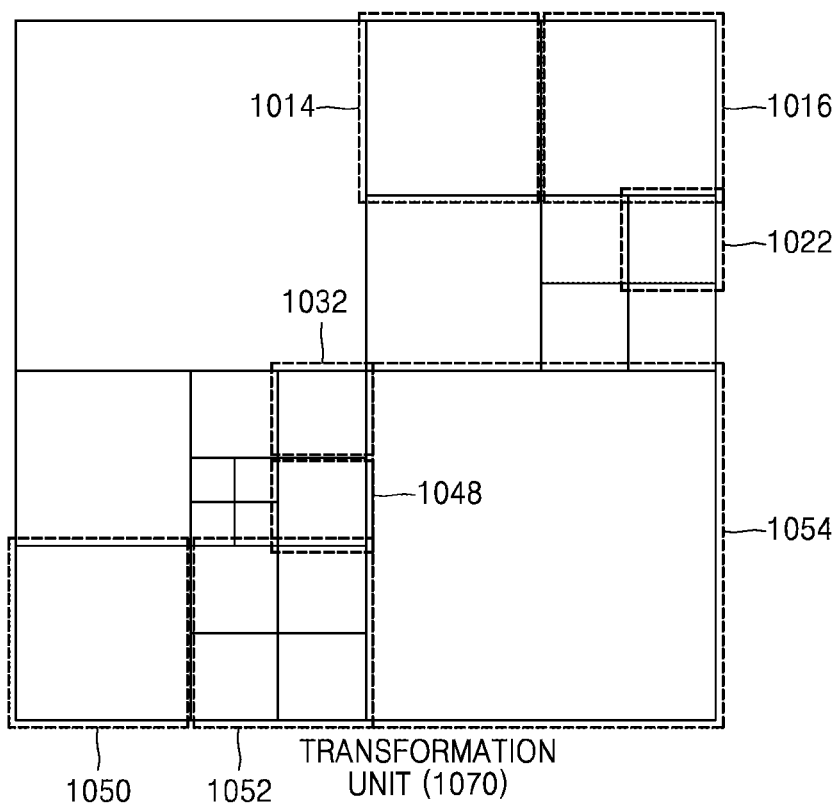

FIGS. 17, 18, and 19 are diagrams for describing a relationship between coding units, prediction units, and transformation units, according to embodiments of the present invention.

Coding units 1010 are deeper coding units according to depths determined by the video encoding apparatus 100, in a largest coding unit. Prediction units 1060 are partitions of prediction units of each of the coding units 1010, and transformation units 1070 are transformation units of each of the coding units 1010.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoders 1014, 1016, 1022, 1032, 1048, 1050, 1052, and 1054 are obtained by splitting the coding units in the encoders 1010. That is, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. That is, the video encoding apparatus 100 according to the present embodiment and the video decoding apparatus 200 according to the present embodiment may perform intra prediction/motion estimation/motion compensation/and transformation/inverse transformation individually on a data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition type, information about a prediction mode, and information about a size of a transformation unit. Table 8 below shows the encoding information that may be set by the video encoding apparatus 100 and the video decoding apparatus 200 according to the embodiments.

TABLE 1

| | | | Split Information 0 (Encoding on Coding Unit having Size of 2N × 2N and Current Depth of d) | | | |
|---|---|---|---|---|---|
| | | | | Size of Transformation Unit | | |
| | Partition Type | | Split Information 0 of Transformation Unit | Split Information 1 of Transformation Unit | |
| Prediction Mode | Symmetrical Partition Type | Asymmetrical Partition Type | | | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The output unit 130 of the video encoding apparatus 100 according to the present embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to the embodiment may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a largest coding unit may be determined.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit are searched using encoded information of the data units, and the searched adjacent coding units may be referred for predicting the current coding unit.

Figure 20:
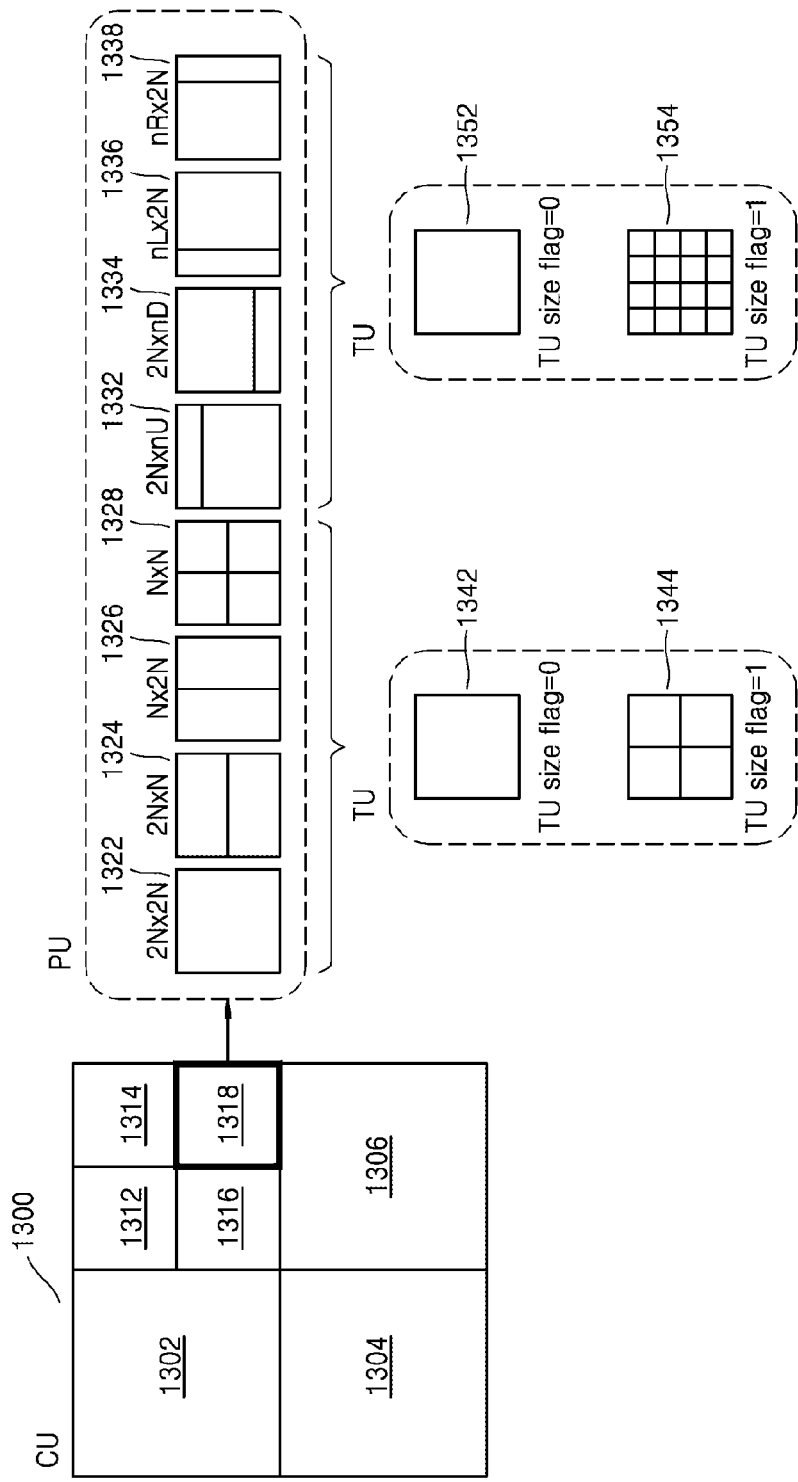
FIG. 20 illustrates a diagram for describing a relationship between a coding unit, a prediction unit, and a transformation unit, according to encoding mode information of Table 1.

FIG. 20 illustrates a diagram for describing a relationship between a coding unit, a prediction unit, and a transformation unit, according to encoding mode information of Table 8.

A largest coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of partition types including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index. A size of a transformation unit corresponding to the transformation index may be changed according to a prediction unit type or partition type of the coding unit.

For example, when the information about the partition type is set to be one of symmetrical partition types 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N is set.

When the information about the partition type is set to be one of asymmetrical partition types 2N×nU 1332, 2N×nD 1334, nL×2N 1336, and nR×2N 1338, if the transformation unit split information is 0, a transformation unit 1352 having a size of 2N×2N may be set, and if the transformation unit split information is 1, a transformation unit 1354 having a size of N/2×N/2 may be set.

As described above with reference to FIG. 20, the transformation unit split information (TU size flag) is a flag having a value or 0 or 1, but the transformation unit split information is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment is capable of encoding maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a−1) then the size of a transformation unit may be 32×32 when a TU size flag is 0, (a−2) may be 16×16 when the TU size flag is 1, and (a−3) may be 8×8 when the TU size flag is 2.

As another example, (b) if the size of the current coding unit is 32×32 and a minimum transformation unit size is 32×32, (b−1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=min(MaxTransformSize,PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=min(MaxTransformSize,PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

For convenience of description, the multilayer video predicting methods and/or the multilayer video decoding method, which are described with reference to FIGS. 1A through 20, are collectively referred to as 'the video encoding method of the present invention'. Also, the video decoding method according to the multilayer video decoding methods described with reference to FIGS. 1A through 20 is referred to as 'the video decoding method of the present invention'.

Also, a video encoding apparatus including the multilayer video encoding apparatus 10, the multilayer video decoding apparatus 20, the video encoding apparatus 100, or the image encoder 400, which is described with reference to FIGS. 1A through 20, is collectively referred as a 'video encoding apparatus of the present invention'. Also, a video decoding apparatus including the multilayer video decoding apparatus 20, the video decoding apparatus 200, or the image decoder 500, which is described with reference to FIGS. 1A through 20, is collectively referred to as a 'video decoding apparatus of the present invention'.

A computer-readable recording medium storing a program, e.g., a disc 26000, according to an embodiment will now be described in detail.

Figure 21:
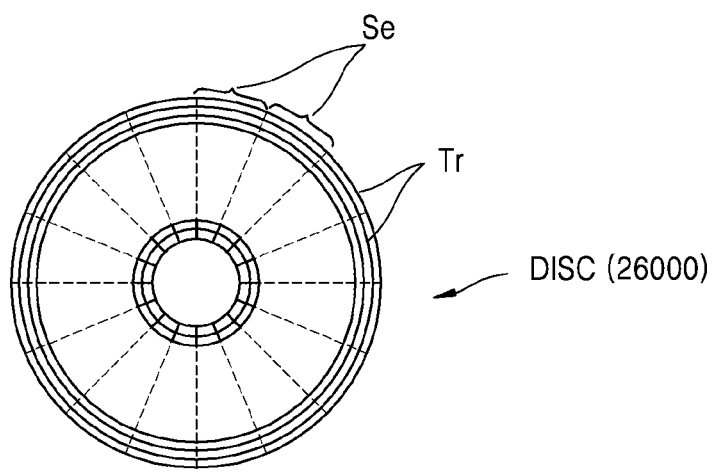
FIG. 21 illustrates a diagram of a physical structure of a disc in which a program is stored, according to an embodiment.

FIG. 21 illustrates a diagram of a physical structure of the disc 26000 in which a program is stored, according to an embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
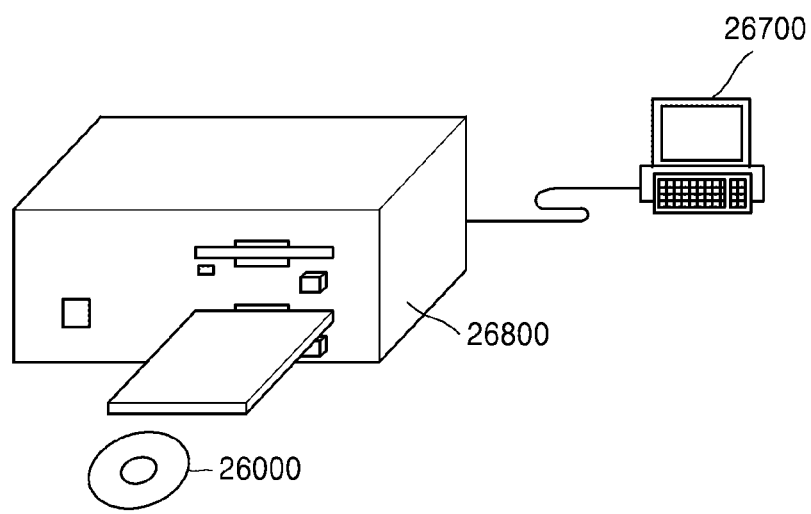
FIG. 22 illustrates a diagram of a disc drive for recording and reading a program by using the disc.

FIG. 22 illustrates a diagram of a disc drive 26800 for recording and reading a program by using the disc 26000. A computer system 26700 may store a program that executes at least one of a video encoding method and a video decoding method according to an embodiment, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to an embodiment may be stored not only in the disc 26000 illustrated in FIGS. 21 and 22 but also may be stored in a memory card, a ROM cassette, or a solid state drive (SSD).

A system to which the video encoding method and the video decoding method described above are applied will be described below.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 24:
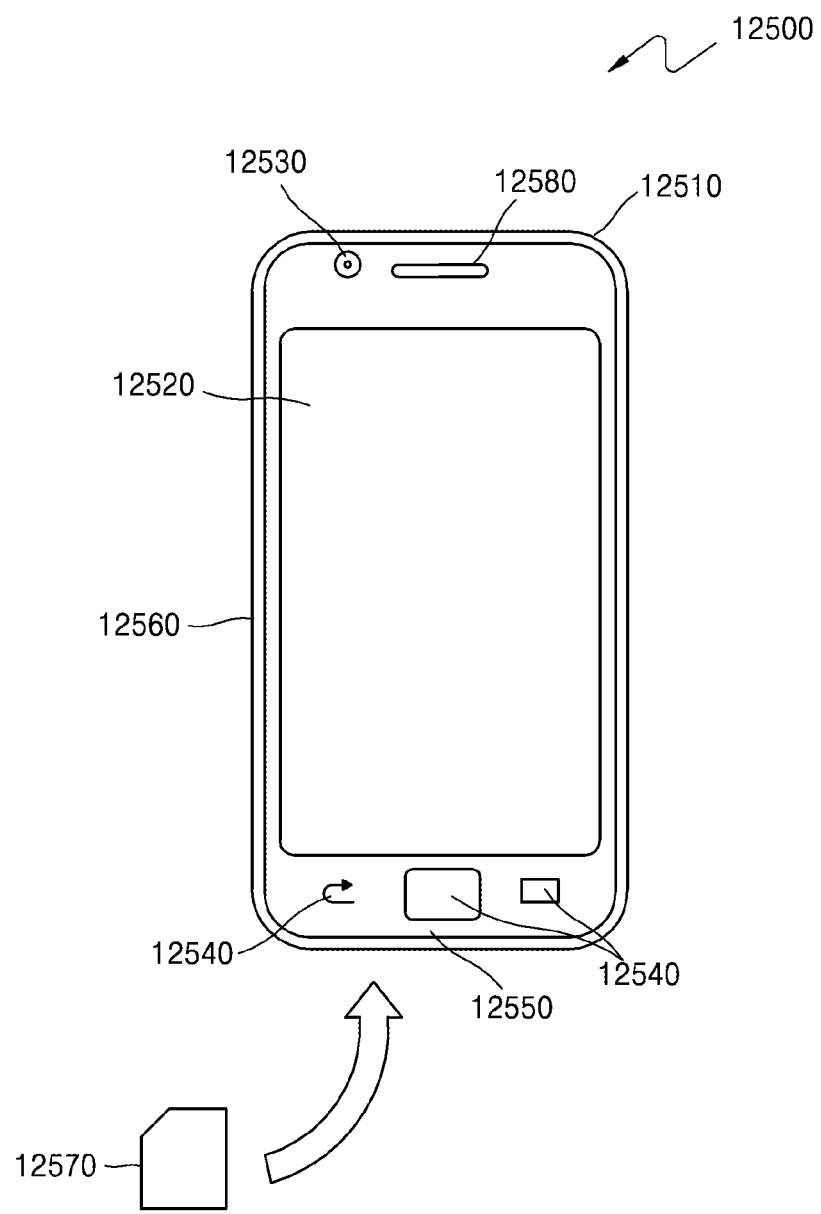
FIGS. 24 and 25 illustrate external and internal structures of a mobile phone to which a video encoding method and a video decoding method are applied, according to embodiments.
Figure 25:
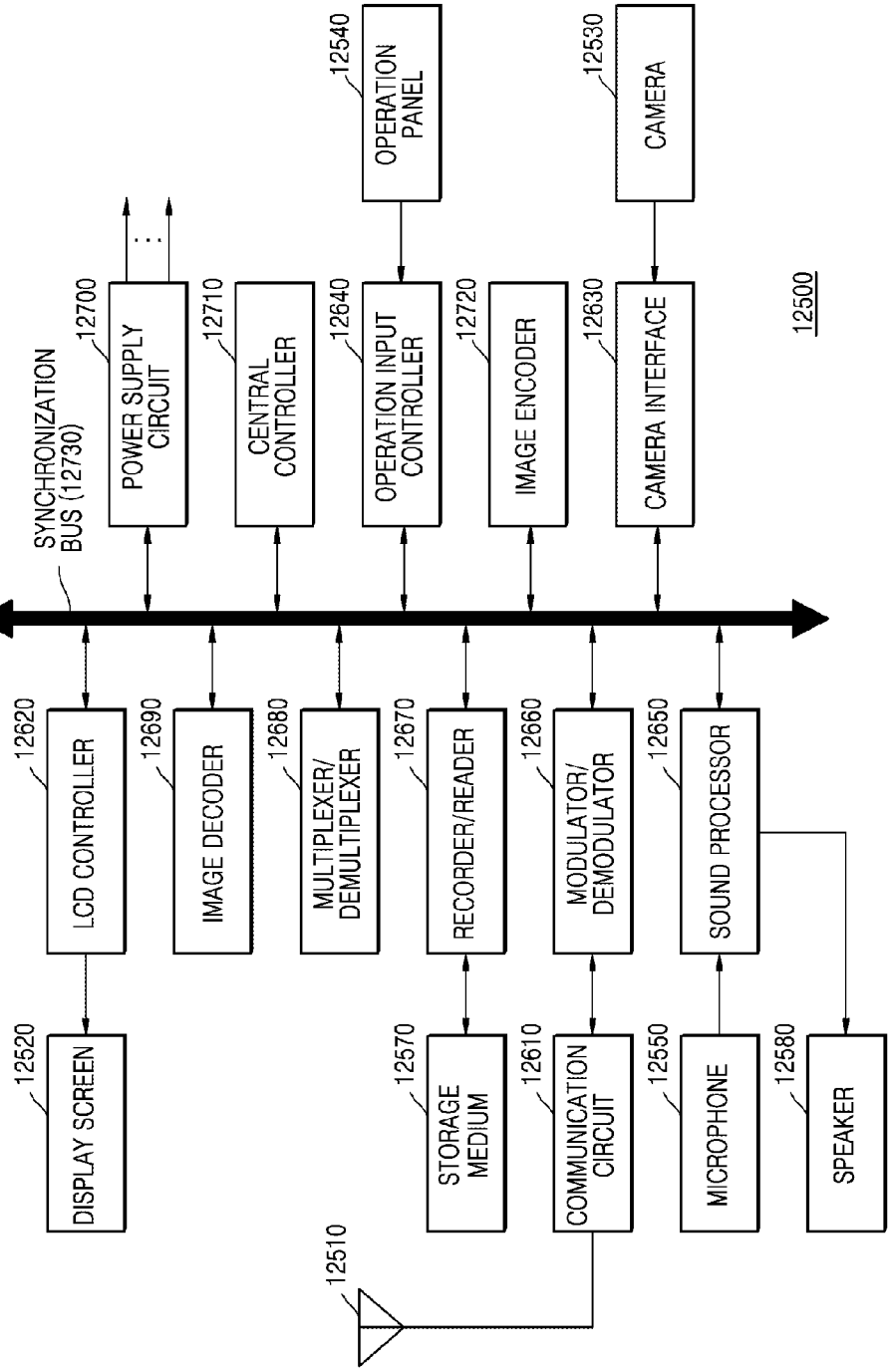

With reference to FIGS. 24 and 25, the mobile phone 12500 included in the content supply system 11000 according to an embodiment will now be described in detail.

FIG. 24 illustrates an external structure of the mobile phone 12500 to which a video encoding method and a video decoding method are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via an alignment bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the alignment bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment, may be a transmitting terminal including only the video encoding apparatus, or may be a receiving terminal including only the video decoding apparatus.

Figure 26:
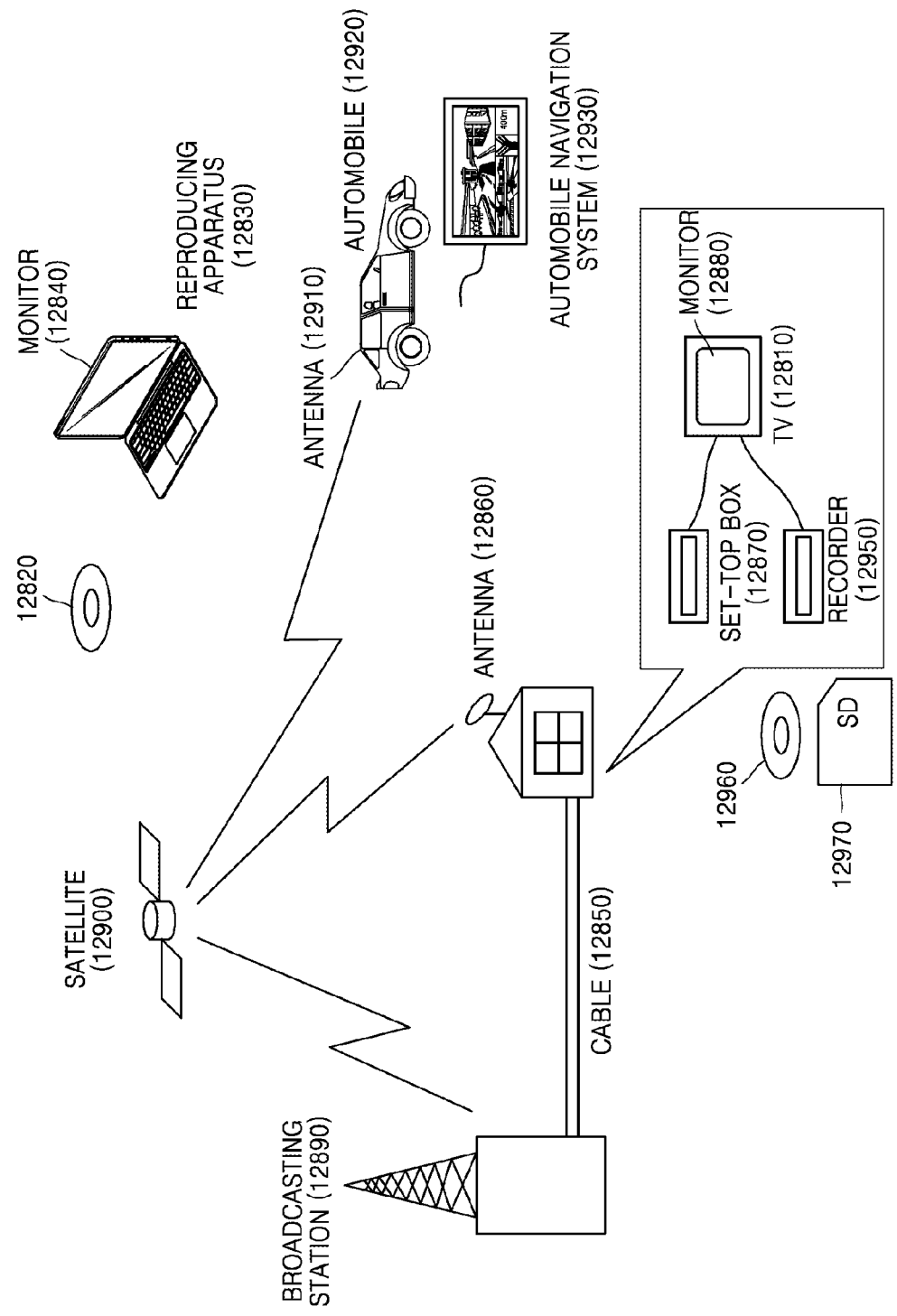
FIG. 26 illustrates a digital broadcasting system employing a communication system, according to an embodiment of the present invention.

A communication system according to an embodiment is not limited to the communication system described above with reference to FIG. 24 (OK ?). For example, FIG. 26 illustrates a digital broadcasting system employing a communication system, according to an embodiment. The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded videostream may be decoded and reproduced by a TV receiver 12810, a set-top box 12870, or another device.

When the video decoding apparatus according to the embodiment is implemented in a reproducing apparatus 12830, the reproducing apparatus 12830 may parse and decode an encoded videostream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the embodiment and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 25. For example, the computer 12100 and the TV receiver 12810 may not include the camera 12530, the camera interface 12630, and the image encoder 12720 of FIG. 25.

Figure 27:
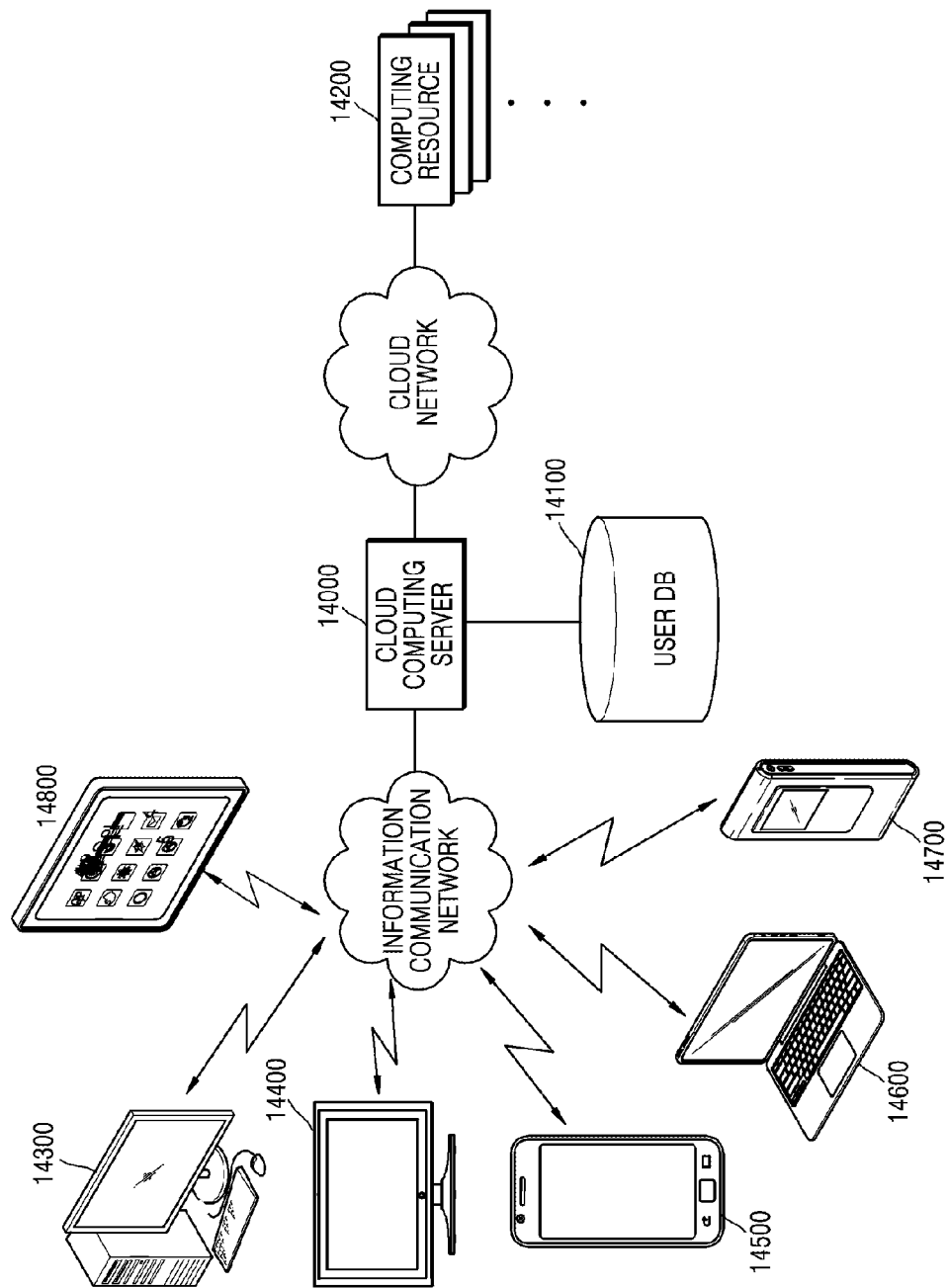
FIG. 27 is a diagram illustrating a network structure of a cloud computing system using a video encoding apparatus and a video decoding apparatus, according to an embodiment of the present invention.

FIG. 27 is a diagram illustrating a network structure of a cloud computing system using a video encoding apparatus and a video decoding apparatus, according to an embodiment of the present invention.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 20. In another example, the user terminal may include the video encoding apparatus as described above with reference to FIGS. 1A through 20. Alternatively, the user terminal may include both the video decoding apparatus and the video encoding apparatus as described above with reference to FIGS. 1A through 20.

Various applications of the video encoding method, the video decoding method, the video encoding apparatus, and the video decoding apparatus according to the embodiments described above with reference to FIGS. 1A through 20 are described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20 are not limited to the embodiments described above with reference to FIGS. 21 through 27.

While this present invention has been particularly shown and described with reference to embodiments thereof, it will be understood by those of ordinary skill in the art that various changes in form and details may be made therein without departing from the spirit and scope of the following claims. The embodiments should be considered in a descriptive sense only and not for purposes of limitation. Therefore, the scope of the present invention is defined not by the detailed description of the present invention but by the appended claims, and all differences within the scope will be construed as being included in the present invention.

The invention claimed is:
1. A video decoding method comprising:
   determining whether a random access point (RAP) picture is positioned in an enhancement layer;
   determining whether a random access skipped leading (RASL) picture related to the RAP picture is reproduced; and
   if the RAP picture is positioned in the enhancement layer and the RASL picture is determined not to be reproduced, activating a sequence parameter set (SPS) corresponding to the RAP picture when the RAP picture that is not at a start point of a coded video sequence (CVS) is decoded.
2. The video decoding method of claim 1, further comprising, when the RASL picture is determined not to be reproduced, discarding the RASL picture related to the RAP picture.

3. The video decoding method of claim 2, wherein, when the RASL picture is discarded, the discarding of the RASL picture further comprises discarding a picture that references the RASL picture.

4. The video decoding method of claim 1, further comprising, when the RASL picture is determined not to be reproduced, setting a most significant bit (MSB) of a picture order count (POC) of the RAP picture as 0.

5. The video decoding method of claim 4, further comprising,
if the RAP picture is positioned in the enhancement layer and the RASL picture is determined not to be reproduced, setting the MSB of the POC of the RAP picture as an MSB of a POC of a picture that is comprised in a base layer of a same access unit as the RAP picture.

6. A video encoding method comprising;
encoding an image as a random access point (RAP) picture, wherein the image is from among pictures comprised in an enhancement layer and is not at a start point of a coded video sequence (CVS); and
when a RASL picture related to the RAP picture is not reproduced, encoding a sequence parameter set (SPS) that is activated in correspondence to decoding of the RAP picture.

7. The video encoding method of claim 6, further comprising, when the RASL picture related to the RAP picture is not reproduced, encoding an image sequence so that the RASL picture related to the RAP picture is discarded.

8. The video encoding method of claim 6, further comprising encoding an image sequence so that a picture that references the discarded RASL picture is discarded.

9. The video encoding method of claim 6, comprising, when a RASL picture related to a RAP picture positioned in a base layer is not reproduced, encoding an image sequence so that a most significant bit (MSB) of a picture order count (POC) of the RAP picture positioned in the base layer is set as 0.

10. The video encoding method of claim 6, comprising when the RASL picture related to the RAP picture is not reproduced, encoding an image sequence so that an MSB of a POC of the RAP picture is set as an MSB of a POC of a picture comprised in a base layer of a same access unit as the RAP picture.

11. A video decoding apparatus comprising:
a receiver configured to receive a bitstream; and
an inter-layer decoder configured to activating an SPS corresponding to a RAP picture when the RAP picture that is not at a start point of a CVS is decoded, wherein the RAP picture is positioned in an enhancement layer and a RASL picture related to the RAP picture is not reproduced.

12. A video encoding apparatus comprising:
an inter-layer encoder configured to encode an image as a RAP picture, wherein the image is from among pictures comprised in an enhancement layer and is not at a start point of a CVS, and
when a RASL picture related to the RAP picture is not reproduced, the inter-layer encoder configured to encode a SPS that is activated in correspondence to decoding of the RAP picture; and
an output unit configured to generate a bitstream for transmitting the encoded data.

13. A non-transitory computer-readable recording medium having recorded thereon a program for executing the video decoding method of claim 1.

14. A non-transitory computer-readable recording medium having recorded thereon a program for executing the video encoding method of claim 6.

* * * * *